(12) United States Patent
Kakura

(10) Patent No.: US 6,754,263 B1
(45) Date of Patent: Jun. 22, 2004

(54) AUTOMATIC EQUALIZER

(75) Inventor: Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 544 days.

(21) Appl. No.: 09/640,889

(22) Filed: Aug. 17, 2000

(30) Foreign Application Priority Data

Aug. 23, 1999 (JP) .......................................... 11-236117

(51) Int. Cl.[7] .............................. H03H 7/30; H03H 7/40; H03K 5/159
(52) U.S. Cl. ....................... 375/232; 375/262; 375/341; 714/795
(58) Field of Search ................................ 708/300, 322, 708/323; 375/229–234, 350, 265, 262, 341; 714/794, 795, 796

(56) References Cited

U.S. PATENT DOCUMENTS

| | | | |
|---|---|---|---|
| 5,539,774 A | * | 7/1996 | Nobakht et al. ............ 375/232 |
| 5,692,011 A | * | 11/1997 | Nobakht et al. ............ 375/233 |
| 6,370,191 B1 | * | 4/2002 | Mahant-Shetti et al. .... 375/233 |

FOREIGN PATENT DOCUMENTS

| | | |
|---|---|---|
| JP | 5-7128 | 1/1993 |
| JP | 6-164316 | 6/1994 |
| JP | 7-95107 | 4/1995 |
| JP | 2586789 | 12/1996 |
| JP | 10-75201 | 3/1998 |

OTHER PUBLICATIONS

Kakura et al., Proceedings of the 1999 Communications Society Conference of IEICE (Sep. 7–10, 1999).
English translation of Japanese Office Action dated Nov. 19, 2002.

* cited by examiner

Primary Examiner—Jean B. Corrielus
(74) Attorney, Agent, or Firm—Dickstein, Shapiro, Morin & Oshinsky, LLP.

(57) ABSTRACT

An automatic equalizer is provided that can suppress errors in code decisions by constraining the selection of survivor paths in a Viterbi calculation. A constraint condition selection circuit 106 inputs the received signal and outputs constraint condition selection signals for selecting constraint conditions corresponding to the regularity of the code that is to be decided, a constraint condition generation circuit inputs $k^M$ series of candidate signals and constraint condition selection signals, selects the regularity of the code corresponding to the constraint condition selection signal, determines the constraint conditions for each of $k^{M-1}$ states of a trellis diagram based on $k^M$ series of candidate signals, and outputs the constraint condition signal, and a Viterbi calculation circuit 103 inputs the $k^M$ estimated error signals and the constraint condition signals, and generates and outputs a decision output signal based on the $k^M$ estimated error signals and the constraint condition signal.

27 Claims, 10 Drawing Sheets

AUTOMATIC EQUALIZER

BACKGROUND OF THE INVENTION

1. Field of the Invention

The present invention relates to an automatic equalizer that compensates a received signal that has been subject to distortion due to intersymbol interference, and in particular, relates to a technology for constraining the survivor paths based on the regularity of the code.

2. Description of the Related Art

Conventionally, a received signal has distortions due to the condition of its transmission channel. One method of compensating this distortion is using an automatic equalizer at the receiver. Here, a conventional automatic equalizer is explained referring to FIG. 8.

FIG. 8 is a structural drawing of a conventional automatic equalizer.

In FIG. 8, reference numeral 501 is an estimation receiving circuit that generates $k^M$ estimated received signals by convolutionally processing $k^M$ series of candidate signals $S_{scan}$ that are a combination of transmitted code having an M chip length (where M is a natural number) and k levels (where k is a natural number) and the impulse response h of a transmission channel having length M, and outputs these generated $k^M$ estimated received signals $S_{er}$. These $k^M$ estimated received signals $S_{er}$ are the signals that are estimated to be the received signals $S_r$.

Reference numeral 502 is a subtracter that generates $k^M$ estimated error signals $S_{err}$ by subtracting the $k^M$ estimated received signals $S_{er}$ from the received signal $S_r$, and outputting these generated $k^M$ estimated error signals $S_{err}$.

Reference numeral 503 is a Viterbi logic circuit that is structured from the path metric calculating circuit 504 and the survivor path selection circuit 505, described below.

Reference numeral 504 is a path metric calculating circuit that inputs the $k^M$ estimated error signals $S_{err}$ and the $k^{M-1}$ survivor path metric signals $S_{pmsv}$ corresponding to each state of a trellis diagram, squares the absolute value of the $k^M$ estimated error signals $S_{err}$ corresponding respectively to the $k^{M-1}$ survivor path metric signals $S_{pmsv}$ to generate $k^M$ path metric signals $S_{pm}$, and outputs these generated $k^M$ path metric signals $S_{pm}$.

Reference numeral 505 is a survivor path selection circuit that inputs the $k^M$ path metric signals $S_{pm}$, determines the smallest among the $k^M$ path metric signals $S_{pm}$ for each $k^{M-1}$ states, outputs these as $k^{M-1}$ survivor path metric signals $S_{pmsv}$, and at the same time, among the $k^M$ series of candidate signals $S_{scan}$, outputs as the decision output signals $S_d$ a portion of the series of candidate signals $S_{scan}$ corresponding to the smallest among the $k^{M-1}$ survivor path metric signals $S_{pmsv}$. That is, the survivor path selection circuit 505 carries out the code decision of the received signals.

Reference numeral 506 is an error correction circuit that generates an error correction decision output signal $S_{ed}$ by correcting the decision output signal $S_d$ by the regularity of the code, and outputs this generated error correction decision output signal $S_{ed}$.

However, the conventional automatic equalizer as described above carries out error correction using the error correction circuit 502 after code the decision, and thus in the case that an error in the code decision is propagated, the error correction effect by the error correction circuit 502 is diminished.

Therefore, in consideration of this problem, it is an object of the present invention to provide a technology that can resolve the above-described problem, and improve the error correction effect even in the case that an error in the code decision in the automatic equalizer is propagated.

SUMMARY OF THE INVENTION

The above described problems are resolved by an automatic equalizer characterized in comprising a received signal estimation circuit that inputs a $k^M$ series of candidate signals that are combinations of transmitted code having an M chip length (where M is a natural number) and k levels (where K is a natural number) and a transmission channel impulse response having a length M, and estimates a received signal by respectively carrying out convolutional processing on the $k^M$ series of candidate signals and the transmission channel impulse response having length M; a subtracter that inputs the received signal and the $k^M$ estimated received signals, generates $k^M$ estimated error signals by subtracting each of the $k^M$ estimated received signals from the received signal, and outputting the generated $k^M$ estimated error signals; a constraint condition selection circuit that inputs the received signal, generates a constraint condition selection signal that represents the regularity of the code of the received signal, and outputs this generated constraint condition selection signal; a constraint condition generation circuit that inputs the $k^M$ series of candidate signals and the constraint condition selection signal, determines the constraint condition for each of $k^{M-1}$ states of a trellis diagram based on the regularity of the code that the constraint condition selection signal represents and the $k^M$ series of candidate signals, and outputs the constraint condition signal that represents the results of this decision, and a Viterbi calculation circuit that inputs the $k^M$ estimated error signals and the constraint condition signal, generates decision output signals based on the $k^M$ estimated error signals and the constraint condition signal, and outputs the generated decision output signals.

In addition, the above-described problems are resolved by an automatic equalizer characterized in comprising a received signal estimated circuit that inputs a $k^M$ series of candidate signals that are combinations of a transmitted code having an M chip length (where M is a natural number) and k levels (where K is a natural number) and a transmission channel impulse response having a length M, and estimates a received signal by respectively carrying out convolutional processing on the $k^M$ series of candidate signals and the transmission channel impulse response having length M; a subtracter that inputs the received signal and the $k^M$ estimated received signals, generates $k^M$ estimated error signals by subtracting each of the $k^M$ estimated received signals from the received signal, and outputting the generated $k^M$ estimated error signals; a constraint condition selection circuit that inputs decision output signals, generates constraint selection signal that represents the regularity of the code of the received signals, and outputs the generated constraint condition selection signal; a constraint condition generation circuit that inputs the $k^M$ series of candidate signals and the constraint condition selection signal, determines the constraint condition for each of $k^{M-1}$ states of a trellis diagram based on the regularity of the code that the constraint condition selection signal represents and the $k^M$ series of candidate signals, and outputs the constraint condition signal that represents the results of this decision, and a Viterbi calculation circuit that inputs the $k^M$ estimated error signals and the constraint condition signal, generates decision output signals based on the $k^M$ estimated error signals and the constraint condition signal, and outputs the generated decision output signals.

In addition, the above-described problems are resolved by an automatic equalizer characterized in comprising a received signal estimated circuit that inputs a $k^M$ series of candidate signals that are combinations of transmitted code having an M chip length (where M is a natural number) and k levels (where K is a natural number), $k^{M-1}$ hypothetical output signals having an N chip length (where N is a natural number), and a transmission impulse response having a length (M+N), and estimates a received signal by carrying out convolutional processing of the combination of the $k^M$ series of candidate signals and the $k^{M-1}$ hypothetical output signals respectively corresponding to the $k^M$ series of candidate signals and the transmission impulse response having a length (M+N); a subtracter that inputs the received signal and the $k^M$ estimated received signals, generates $k^M$ estimated error signals by subtracting each of the $k^M$ estimated received signals from the received signal, and outputting the generated $k^M$ estimated error signals; a constraint condition selection circuit that inputs the received signal, generates constraint selection signal that represents the regularity of the code of the received signals, and outputs the generated constraint condition selection signal; a constraint condition generation circuit that inputs the $k^M$ series of candidate signals, the $k^{M-1}$ hypothetical output signals, and the constraint condition selection signal, determines the constraint condition for each of $k^{M-1}$ states of a trellis diagram based on the regularity of the code that the constraint condition selection signal represents, the $k^M$ series of candidate signals, and the $k^{M-1}$ hypothetical output signals, and outputs the constraint condition signal that represents the results of this decision, and a Viterbi calculation circuit that inputs the $k^M$ estimated error signals and the constraint condition signal, generates the decision output signals and $k^{M-1}$ hypothetical output signals for each state of a trellis diagram by carrying out code decisions based on the $k^M$ estimated error signals and the constraint condition signal, and outputs the generated decision output signals and the $k^{M-1}$ hypothetical output signals for each state of the trellis diagram.

In addition, the above-described problems are resolved by an automatic equalizer characterized in comprising a received signal estimation circuit that inputs a $k^M$ series of candidate signals that are combinations of transmitted code having an M chip length (where M is a natural number) and k levels (where K is a natural number), $k^{M-1}$ hypothetical output signals having an N chip length (where N is a natural number), and a transmission impulse response having a length (M+N), and estimates a received signal by carrying out convolutional processing on the combination of the $k^M$ series of candidate signals and the $k^{M-1}$ hypothetical output signals respectively corresponding to the $k^M$ series of candidate signals, and the transmission impulse response having a length (M+N); a subtracter that inputs the received signal and the $k^M$ estimated received signals, generates $k^M$ estimated error signals by subtracting each of the $k^M$ estimated received signals from the received signal, and outputting these generated $k^M$ estimated error signals; a constraint condition selection circuit that inputs the decision output signals, generates a constraint selection signal that represents the regularity of the code of the received signals, and outputs the generated constraint condition selection signal; a constraint condition generation circuit that inputs the $k^M$ series of candidate signals, the $k^{M-1}$ hypothetical output signals, and the constraint condition selection signal, determines the constraint condition for each of $k^{M-1}$ states of a trellis diagram based on the regularity of the code that the constraint condition selection signal represents, the $k^M$ series of candidate signals, and the $k^{M-1}$ hypothetical output signals, and outputs the constraint condition signal that represents the results of this decision, and a Viterbi calculation circuit that inputs the $k^M$ estimated error signals and the constraint condition signal, generates the decision output signals and $k^{M-1}$ hypothetical output signals for each state of a trellis diagram by carrying out code decisions based on the $k^M$ estimated error signals and the constraint condition signal, and outputs the generated decision output signals and the $k^{M-1}$ hypothetical output signals for each state of the trellis diagram.

In addition, the above-described problems are resolved by an automatic equalizer characterized in comprising a received signal estimation circuit that inputs a $k^M$ series of candidate signals that are combinations of transmitted code having M chip length (where M is a natural number) and k levels (where K is a natural number), a decision output signal having an N chip length (where N is a natural number), and a transmission channel impulse response having a length (M+N), and estimates a received signal by carrying out convolutional processing on the combination of the $k^M$ series of candidate signals and the $k^{M-1}$ hypothetical-output signals respectively corresponding to the $k^M$ series of candidate signals with the transmission impulse response having a length (M+N) and outputs the estimated $k^M$ estimated received signals; a subtracter that inputs the received signal and the $k^M$ estimated received signals, generates $k^M$ estimated error signals by subtracting each of the $k^M$ estimated received signals from the received signal, and outputting these generated $k^M$ estimated error signals; a constraint condition selection circuit that inputs the received signal, generates a constraint condition selection signal that represents the regularity of the code of the received signal, and outputs the generated constraint condition selection signal; a constraint condition generation circuit that inputs the $k^M$ series of candidate signals, the decision output signal, and the constraint condition selection signal, determines the constraint condition for each of $k^{M-1}$ states of a trellis diagram based on the regularity of the code that the constraint condition selection signal represents, the $k^M$ series of candidate signals, and the decision output signals, and outputs the constraint condition signal that represents the results of this decision, and a Viterbi calculation circuit that inputs the $k^M$ estimated error signals and the constraint condition signal, generates decision output signals based on the $k^M$ estimated error signals and the constraint condition signal, and outputs the generated decision output signals.

In addition, the above-described problems are resolved by an automatic equalizer characterized in comprising a received signal estimation circuit that inputs a $k^M$ series of candidate signals that are combinations of transmitted code having an M chip length (where M is a natural number) and k levels (where K is a natural number), decision output signals having an N chip length (where N is a natural number), and a transmission impulse response having a length (M+N), and estimates a received signal by carrying out combinational processing of the combination of the $k^M$ series of candidate signals and the $k^{M-1}$ hypothetical output signals respectively corresponding to the $k^M$ series of candidate signals with the transmission impulse response having a length (M+N) and outputting the estimated $k^M$ estimated received signals; a subtracter that inputs the received signal and the $k^M$ estimated received signals, generates $k^M$ estimated error signals by subtracting each of the $k^M$ estimated received signals from the received signal, and outputting these generated $k^M$ estimated error signals; a constraint condition selection circuit that inputs the decision output signals, generates a constraint condition selection signal that represents the regularity of the code of the received signal, and outputs these generated constraint condition selection signal; a constraint condition generation circuit that inputs the $k^M$ series of candidate signals, the decision output signals, and the constraint condition selection signal, determines the constraint condition for each of $k^{M-1}$ states of a trellis diagram based on the regularity of the code that the constraint condition selection signal represents, the $k^M$ series of candidate signals, and the decision output signals, and outputs the constraining condition signal that represents the results of this decision, and a Viterbi calculation circuit that inputs the $k^M$ estimated error signals and the constraint condition signal, generates the decision output signals based on the $k^M$ estimated error signals and the constraint condition signal, and outputs the generated decision output signals.

In addition, the Viterbi calculation circuit is characterized in comprising a path metric calculation circuit that inputs the $k^M$ estimated error signals and the $k^{M-1}$ survivor path metric signals corresponding to each state of the trellis diagram, calculates the absolute value of the $K^M$ estimated error signals respectively corresponding to the $k^{M-1}$ survivor path metric signals, and outputs the generated $k^M$ path metric signals, and a survivor path selection circuit that inputs the $k^M$ path metric signals and the constraint condition signal, determines among the $k^M$ path metric signals the one for which the state transition in the trellis diagram satisfy and minimize the constraint condition represented by the constraint condition signal for each of $k^M$ conditions, and outputs the result as the $k^{M-1}$ survivor path metric signals, and at the same time outputs as decision output signals a specified portion of the $k^M$ series of candidate signals corresponding to those for which the $k^{M-1}$ series of candidate signals are minimal.

In addition, the Viterbi calculation circuit is characterized in comprising a path metric calculation circuit that inputs the $k^M$ estimated error signals and the $k^{M-1}$ survivor path metric signals corresponding to each state of the trellis diagram, calculates the absolute value of the $K^M$ estimated error signals respectively corresponding to the $k^{M-1}$ survivor path metric signals, and outputs the generated $k^M$ path metric signals, and a survivor path selection circuit that inputs the $k^M$ path metric signals and the constraint condition signal, determines among the $k^M$ path metric signals those for which the state transition in the trellis diagram satisfy and minimize the constraint condition represented by the constraint condition signal for each of $k^M$ conditions, and outputs the result as the $k^{M-1}$ survivor path metric signals, and at the same time outputs as hypothetical output signals a specified portion of the $k^M$ series of candidate signals respectively corresponding to the $k^{M-1}$ survivor path metric signals, and outputs as decision output signals a specified portion of the $k^M$ series of candidate signals corresponding to those among the $k^{M-1}$ survivor path metric signals that are minimal.

In addition, the Viterbi calculation circuit is characterized in comprising a path metric calculation circuit that inputs the $k^M$ estimated error signals and the $k^{M-1}$ survivor path metric signals corresponding to each state of the trellis diagram, squares the absolute value of the $k^M$ estimated error signals corresponding respectively to the $k^{M-1}$ survivor path metric signals, and outputs the results as $k^M$ path metric signals, a path metric offset circuit that inputs the $k^M$ path metric signals and the constraint condition signal, and outputs kM offset path metric signals having added a specified offset value only to those among the kM path metric signals for which the state transitions of the trellis diagram do not fulfill the constraint conditions represented by the constraint condition signal, and a survivor path selection circuit that inputs the $k^M$ offset path metric signals, determines for each of the $k^{M-1}$ state those among the $k^M$ offset path metric signals that are minimal, and outputs the result as the $k^{M-1}$ survivor path metric signals, and at the same time outputs as hypothetical output signals a specified portion of the series of candidate signals among the $k^M$ series of candidate signals for which the corresponding $k^{M-1}$ survivor path metric signals are minimal.

In addition, the Viterbi calculation circuit is characterized in comprising a path metric calculation circuit that inputs the $k^M$ estimated error signals and the $k^{M-1}$ survivor path metric signals corresponding to each state of the trellis diagram, and outputs the $k^M$ path metric signals having added the square of the absolute value of the $k^M$ estimated error signals corresponding respectively to the $k^{M-1}$ survivor path metric signals, a path metric offset circuit that inputs the $k^M$ path metric signals and the constraint condition signal, adds a specified offset value only to those among the $k^M$ path metric signals for which the state transition in the trellis diagram does not satisfy the constraint condition represented by the constraint condition signal, and outputs the result as $k^M$ offset path metric signals, and a survivor path selection circuit that inputs the $k^M$ offset path metric signals, determines among the $k^M$ offset path metric signals those that are minimal for each of $k^{M-1}$ conditions, and outputs the result as the $k^{M-1}$ survivor path metric signals, and at the same time outputs as hypothetical output signals a specified portion of the series of candidate signals among the $k^M$ series of candidate signals that correspond respectively to the $k^{M-1}$ survivor path metric signals, and in addition, outputs as the decision output signals a specified portion of the series of candidate signals among the $k^M$ series of candidate signals those for which the corresponding $k^{M-1}$ survivor path metric signals are minimal.

In addition, the Viterbi calculation circuit is characterized in comprising an estimated error offset circuit that inputs the $k^M$ estimated error signals and the constraint condition signal, and among the $k^M$ estimated error signals, outputs the $k^M$ offset estimated error signals having added a specified offset value only to those for which the state transitions in the trellis diagram do not satisfy the constraint condition represented by the constraint condition signal, a path metric calculation circuit that inputs the $k^M$ offset estimated error signals and the $k^{M-1}$ survivor path metric signals corresponding to each condition of the trellis diagram, and outputs $k^M$ path metric signals to which square of the absolute value of the $k^M$ offset estimated error signals corresponding respectively to the $k^{M-1}$ survivor path metric signals has been added, and a survivor path selection circuit that inputs the $k^M$ path metric signals, determines for each of $k^{M-1}$ conditions those among the $k^M$ path metric signals that become minimum, and output the result as $k^{M-1}$ survivor path metric signals, and at the same time outputs as decision output signals a specified portion of the series of candidate signals corresponding to those among the $k^M$ series of candidate signals for which $k^{M-1}$ survivor path metric signals are minimal.

In addition, the Viterbi calculation circuit is characterized in comprising an estimated error offset circuit that inputs the $k^M$ estimated error signals and the constraint condition signal, and outputs the $k^M$ offset estimated error signals having added a specified offset value only to those among the $k^M$ estimated error signals for which the state transitions in the trellis diagram do not satisfy the constraint condition represented by the constraint condition signal, a path metric calculation circuit that inputs the $k^M$ offset estimated error signals and the $k^{M-1}$ survivor path metric signals corresponding to each state of the trellis diagram, and outputs $k^M$ path metric signals to which square of the absolute value of the $k^M$ offset estimated error signals corresponding respectively to the $k^{M-1}$ survivor path metric signals has been added, and a survivor path selection circuit that inputs the $k^M$ path metric signals, determines for each of $k^{M-1}$ conditions those among the $k^M$ path metric signals that become minimum, and output the result as $k^{M-1}$ of survivor path metric signals, and at the same time outputs as hypothetical output signals a specified portion of the series of candidate signals respectively corresponding to the $k^{M-1}$ survivor path metric signals, and in addition, outputs as decision output signals a specified portion of the series of candidate signals corresponding to those among the $k^M$ series of candidate signals for which $k^{M-1}$ survivor path metric signals that become minimum.

In addition, the above-described problems are resolved by an automatic equalizer that compensates a received signal that has been distorted by intersymbol interference provides a means for detecting regularity in the code of the received signals, a means for calculating and outputting the path metric signals for each condition of the received signal, and a means that determines as the most likely states those states of the received signals that satisfy the detected regularity of the code of the received signal and have minimal path metric signals.

In addition, the above-described problems are resolved by an automatic equalizer that compensates a received signal that has been distorted by intersymbol interference provides a means for detecting regularity in the code of the received signals, a means for calculating and outputting the path metric singles for each condition of the received signal, a means for determining whether or not the received signal satisfies the detected regularity of the code of the received signals, and only in the case that as a result of the decision the received signal satisfies the regularity of the code, adds a specified offset value to the path metric signals, and a means that determines as the most likely states those states of the received signals that satisfy the detected regularity of the code of the received signal and have minimal path metric signals.

In addition, the above-described problems are resolved by an automatic equalizer that compensates a received signal that has been distorted by intersymbol interference, provides a means that generates a plurality of estimation received signals that estimate received signals by using convolutional processing, a means that generates a plurality of estimated error signals by subtracting each of the estimated received signals from the received signal, a means for detecting regularity in the code of the received signal, a means for determining whether or not the received signal satisfies the detected regularity of the code of the received signal, and only in the case that as a result of the decision the received signal satisfies the regularity of the code, adds a specified offset value to the path metric signals, a means that calculates and outputs path metric signals in each state of the received signal from the estimated error signals, and a means that determines as the most likely states those states of the received signal that have minimal path metric signals.

In particular, the means that detects the regularity of the code in the received signals is characterized in detecting the regularity of the code based on the received signals that have already been received. The means for detecting the regularity of the code in the received signals is characterized in detecting the regularity of the code based on the condition of the most likely received signals determined by the control means.

That is, in the present invention, errors in code determination are reduced by constraining the selection of survivor paths based on the regularity of the code.

DETAILED DESCRIPTION OF THE INVENTION

A first embodiment of the present invention will be explained referring to FIG. 1 and FIG. 2.

Figure 1:
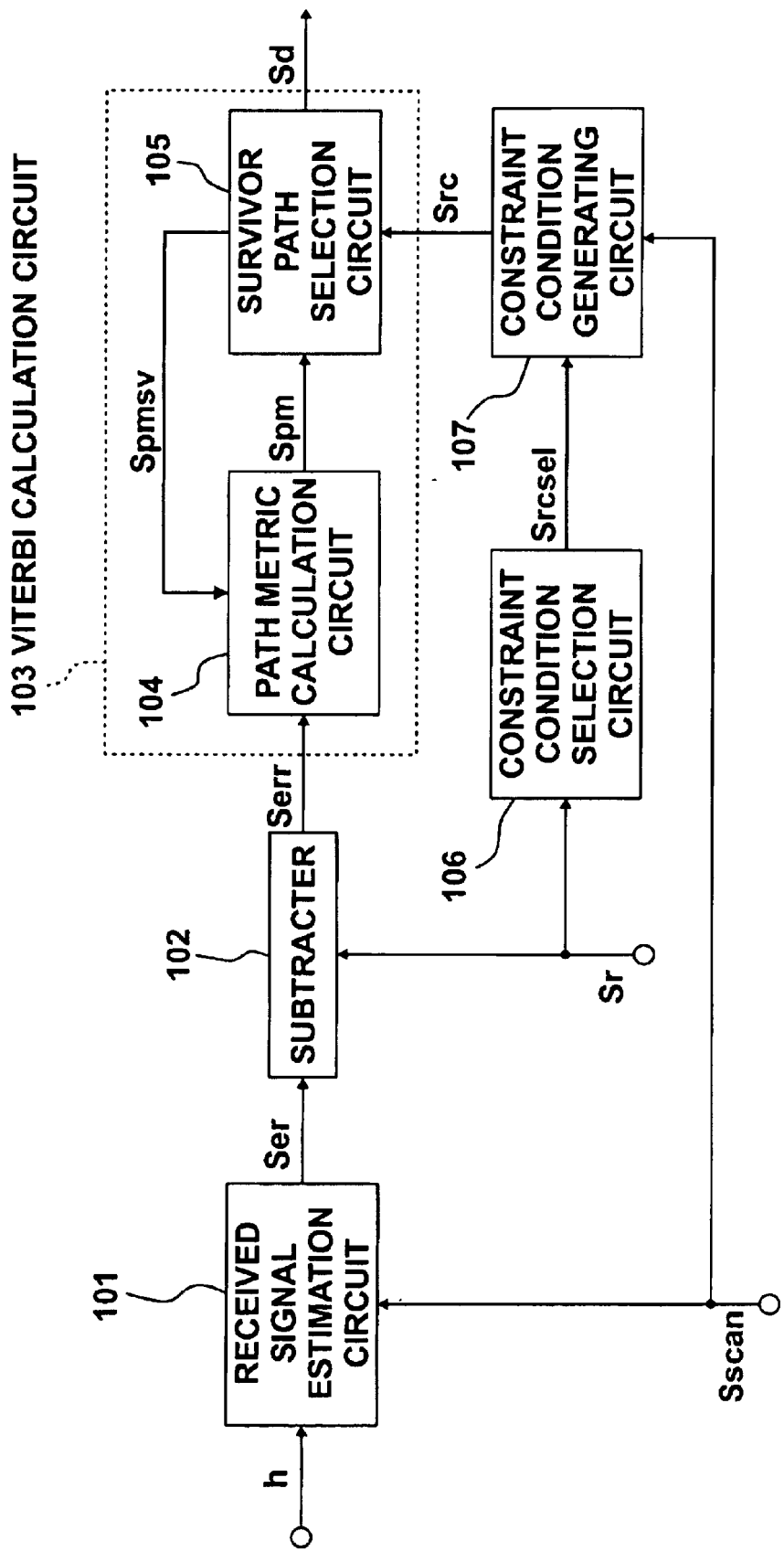
FIG. 1 is a block diagram of the automatic equalizer according to a first embodiment of the present invention.

FIG. 1 is a block diagram of the automatic equalizer according to a first embodiment of the present invention. FIG. 2 is a trellis diagram showing the states of the code decision.

In FIG. 1, reference numeral 101 is a received signal estimation circuit that inputs $k^M$ series of candidate signals $S_{scan}$ that are combinations of transmitted code having an M chip length and k levels and a transmission channel impulse response h having a length M. Additionally, the received signals are estimated by carrying out convolutional processing of the respective $k^M$ series of input candidate signals $S_{scan}$ and a transmission channel impulse response h having a length M. Next, the estimated $k^M$ estimated received signals $S_{er}$ are output to the subtracter 102, explained below.

Reference 102 is a subtracter that inputs the received signal $S_r$ and the $k^M$ estimated received signals. Additionally, $k^M$ estimated error signals $S_{err}$ are generated by subtracting each of the $k^M$ estimated received signals $S_{er}$ from the input received signal $S_r$. Next, the generated $k^M$ estimated error signals $S_{err}$ are output to a path metric calculation circuit 104, described below.

Reference numeral 103 is a Viterbi calculation circuit that is formed by the path metric calculation circuit 104 and a survivor path selection circuit 105, described next.

Reference numeral 104 is a path metric calculation circuit that inputs $k^M$ estimated error signals $S_{err}$ and $k^{M-1}$ survivor path metric signals $S_{pmsv}$ that correspond to each of the states of the trellis diagram. In addition, the path metric calculation circuit 104 squares the absolute value of the $k^M$ estimated error signals $S_{err}$ corresponding respectively to the $k^{M-1}$ survivor path metric signals $S_{pmsv}$, and generates $k^M$ path metric signals $S_{pm}$. Next, these generated $k^M$ path metric signals $S_{pm}$ are output to the survivor path selection circuit 105, described next.

Reference numeral 105 is a survivor path selection circuit that inputs the $k^M$ path metric signals $S_{pm}$ and the constraint condition signal $S_{rc}$, described below. Additionally, among the $k^M$ path metric signals $S_{pm}$, those for which the state transitions in the trellis diagram satisfy the constraint condition represented by the constraint condition signal $S_{rc}$ and whose values for the path metric signals $S_{pm}$ are minimal are determined for each of $k^{M-1}$ states, and the results are output to the path metric calculation circuit 104 as the $k^{M-1}$ survivor path metric signals $S_{pmsv}$. In addition, among the $k^M$ series of candidate signals $S_{scan}$, a specified portion of the series of candidate signals $S_{scan}$, corresponding to those among the $k^{M-1}$ survivor path metric signals $S_{pmsv}$ that are minimal are output as decision output signals $S_d$. For example, the lowest bit of the series of candidate signals $S_{scan}$ is output as the decision output signal $S_d$. That is, it is determined to be the most likely received signal.

Reference numeral 106 is a constraint condition selection circuit that inputs the received signals $S_r$. Additionally, it detects the regularity of the code based on the received signal $S_r$. Next, constraint condition selection signal $S_{rcsel}$ is generated in order to select the constraint condition corresponding to the regularity of the detected code. In addition, the generated constraint condition selection signal $S_{rcsel}$ is output to the constraint condition generation circuit 107, described next.

Reference numeral 107 is a constraint condition generating circuit that inputs the $k^M$ series of candidate signals $S_{scan}$ and the constraint condition selection signal $S_{rcsel}$. In addition, the constraint condition is determined for each of the $k^{M-1}$ states of the trellis diagram based on the regularity of the code corresponding to the input constraint condition selection signal $S_{rcsel}$ and the $k^M$ series of candidate signals $S_{scan}$. Next, the constraint condition signal $S_{rc}$ that represents the determined constraint condition is generated. In addition, the generated constraint condition signal $S_{rc}$ is output to the survivor path selection circuit 105.

Next, the operation of the first embodiment will be explained using specific numerical values.

Suppose, for example, that the transmitted code has the two levels, "0" and "1", and that the series of candidate signals $S_{scan}$ have a 2-chip length. Here, a case will be explained in which the code decision is carried out at time I.

Figure 2:
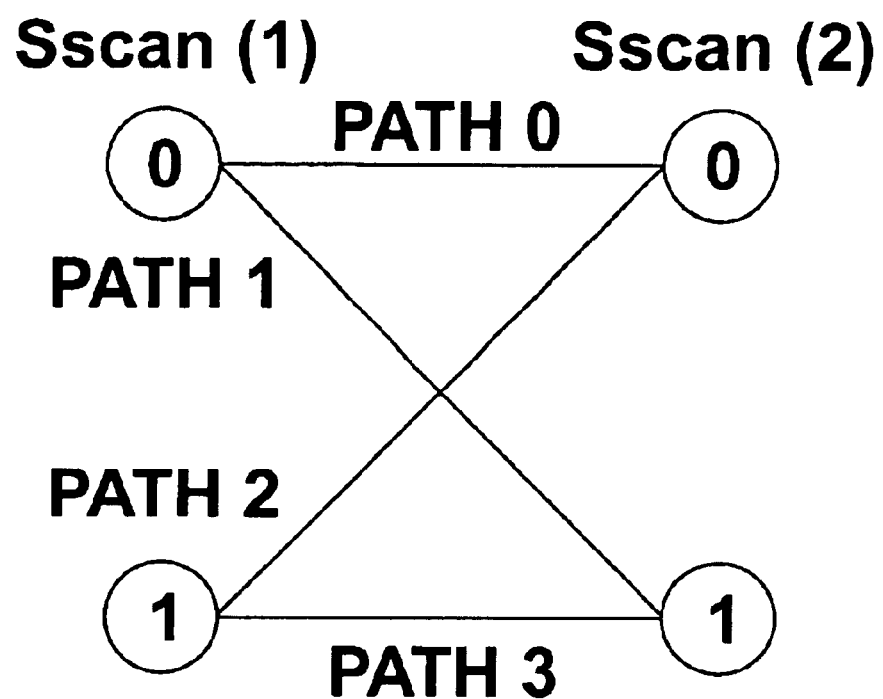
FIG. 2 is a trellis diagram in the code decision according to a first and a second embodiments the present invention.

As shown in FIG. 2, $S_{scan}$ (1) corresponds to the candidate of the decision output signal $S_c$ (I) at time I. In addition, $S_{scan}$ (2) corresponds to the candidate of the decision output signal $S_d$ (I+1) at time (I+1).

Here, the constraint condition represented by the constraint condition signal $S_{rc}$ is assumed to be $S_{scan}$ (2)=$S_{scan}$ (1). It is assumed that this condition, for example, is always generated after a known transmitted code series. Thus, the constraint condition selection circuit 106 takes the correlation between the known transmission signal series and the received signals $S_r$. Next, the constraint condition selection circuit 106 selects the condition that $S_{scan}$ (2)=$S_{scan}$ (1) iii the case that the correlation value is equal to or greater than a specified threshold value.

Furthermore, the received signal $S_r$ is assumed to be 0.5. In addition, in FIG. 2, at path 0, the estimated received signal $S_{er}$ (0)=0.3, at path 1, the estimated received signal $S_{er}$ (1)=0.4, at path 2, the estimated receive signal $S_{er}$ (2)=0.4, and at path 3, the estimated received signal $S_{er}$ (3)=0.7. At this time, each of the estimated error signals $S_{err}$ is:

$S_{err}(0)=S_r-S_{er}(0)=0.5-0.3=0.2$ $S_{err}(1)=S_r-S_{er}(1)=0.5-0.4=0.1$ $S_{err}(2)=S_r-S_{er}(2)=0.5-0.4=0.1$ $S_{err}(3)=S_r-S_{er}(3)=0.5-0.7=-02$ In addition, the survivor path metric signal in the case that the state is "0" at time I is $S_{pmsv}$ (0)=0.12, and the survivor path metric signal in the case that the state is "1" is $S_{pmsv}$ (1)=0.1. The path metric signals $S_{pm}$ corresponding to the paths 0, 1, 2, and 3 in this case are:

$S_{pm}(0)=S_{pmsv}(0)+|S_{err}(0)|^2=0.12+|0.2|^2=0.16$ $S_{pm}(1)=S_{pmsv}(0)+|S_{err}(1)|^2=0.12+|0.1|^2=0.13$ $S_{pm}(2)=S_{pmsv}(1)+|S_{err}(2)|^2=0.1+|0.1|^2=0.11$ $S_{pm}(3)=S_{pmsv}(1)+|S_{err}(3)|^2=0.1+|-0.2|^2=0.14$ The survivor path metric signals having a state "0" at tine (I+1) are selected from $S_{pm}$ (0) and $S_{pm}$ (2). The value (0.11) of $S_{pm}$ (2) is smaller than the value (0.16) of $S_{pm}$ (0). However, path 0 satisfies the constraint condition $S_{scan}$ (2)=$S_{scan}$ (1), while path 2 does not satisfy the constraint condition $S_{scan}$ (2)=$S_{scan}$ (1).

The survivor path metric signals having a state "1" at time (I+1) are selected from $S_{pm}$ (1) and $S_{pm}$ (3). The value (0.13) of $S_{pm}$ (1) is smaller than the value (0.14) of $S_{pm}$ (3). However, path 3 satisfies the constraint condition $S_{scan}$ (2)=$S_{scan}$ (1), while path 1 does not satisfy the constraint condition $S_{scan}$ (2)=$S_{scan}$ (1). Therefore, the survivor path metric signals $S_{pmsv}$ with states "0" and "1" at time (I+1) are:

$S_{pmsv}(0)=S_{pm}(0)=0.16$(state "0")

$S_{pmsv}(1)=S_{pm}(3)=0.14$(state "1")

Second Embodiment

Figure 3:
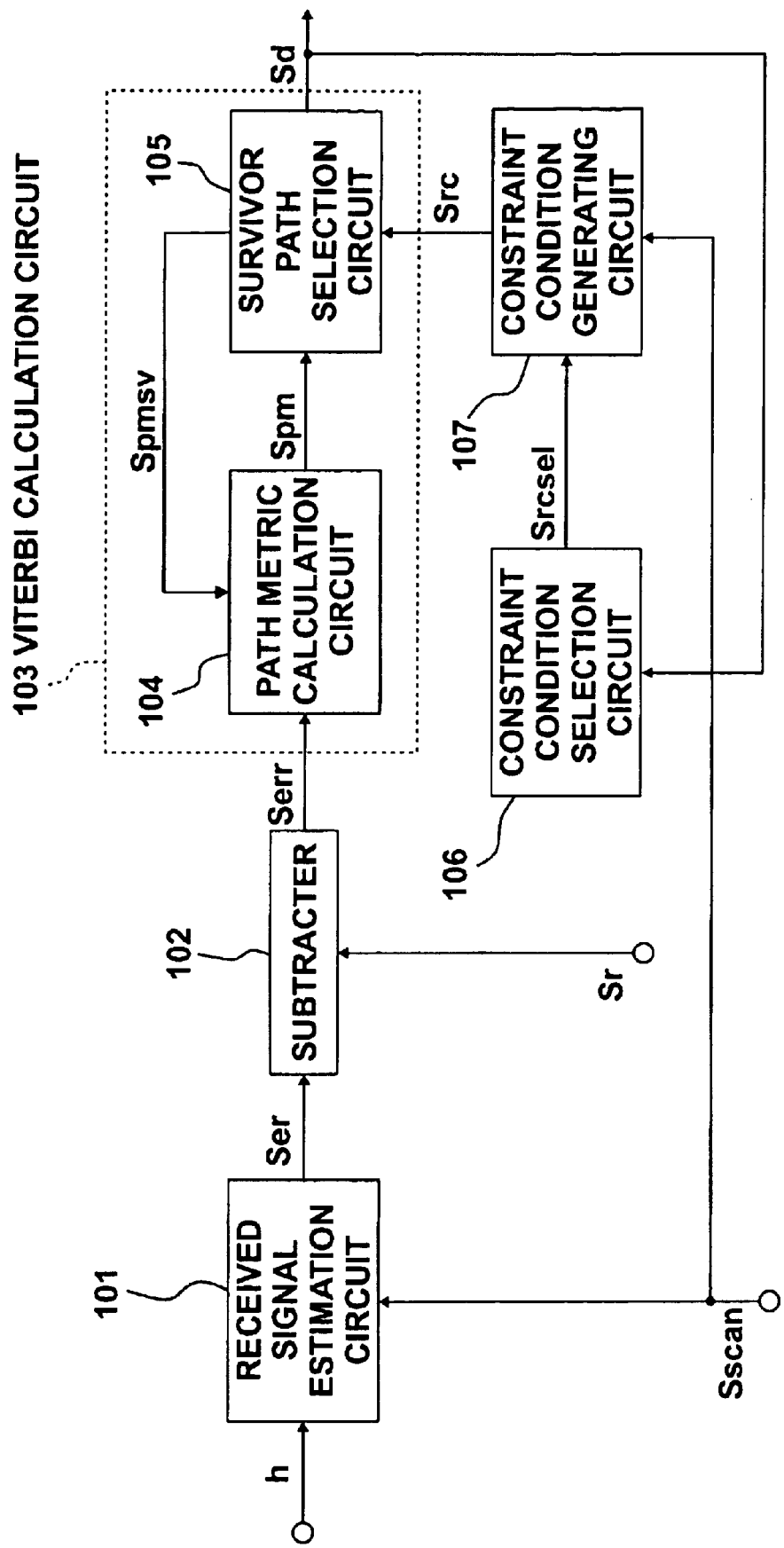
FIG. 3 is a block diagram of the automatic equalizer according to a second embodiment of the present invention.

Next, a second embodiment of the present invention will be explained referring to FIG. 2 and FIG. 3. FIG. 2 is a trellis diagram showing the states of the code decision. FIG. 3 is a block diagram of the automatic equalizer according to the second embodiment of the present invention.

In FIG. 3, reference numeral 101 is a received signal estimation circuit that inputs $k^M$ series of candidate signals $S_{scan}$ that are combinations of transmitted code having an M chip length and k levels and a transmission channel impulse response h having a length M. Additionally, the received signals are estimated by convolutional processing of the respective $k^M$ series of candidate signals $S_{scan}$ and the transmission channel impulse response h having a length M. Next, the estimated $k^M$ estimated received signals $S_{er}$ are output to the subtracter 102, explained next.

Reference 102 is a subtracter that inputs the received signals $S_r$ and the k estimated received signals $S_{er}$. Additionally $k^M$ estimated error signals $S_{er}$ are generated by subtracting each of the $k^M$ estimated received signals $S_{er}$ from the input received signal $S_r$. Next, the generated $k^M$ estimated error signals $S_{err}$ are output to the path metric calculation circuit 104, described below.

Reference numeral 103 is a Viterbi calculation circuit that is formed by a path metric calculation circuit 104 and a survivor path selection circuit 105, described next.

Reference numeral 104 is a path metric calculation circuit that inputs $k^M$ estimated error signals $S_{err}$ and $k^{M-1}$ survivor path metric signals $S_{pmsv}$ that correspond to each of the states of the trellis diagram. In addition, the path metric calculation circuit 104 squares the absolute value of the $k^M$ estimated error signals $S_{err}$ corresponding respectively to the $k^{M-1}$ survivor path metric signals $S_{pmsv}$, and generates $k^M$ path metric signals $S_{pm}$. Next, these generated $k^M$ path metric signals $S_{pm}$ are output to the survivor path selection circuit 105, described next.

Reference numeral 105 is a survivor path selection circuit that inputs the $k^M$ path metric signals $S_{pm}$ and the constraint condition signal $S_{re}$, described below. Additionally, among the $k^M$ path metric signals $S_{pm}$, those for which the state transitions in the trellis diagram satisfy the constraint condition represented by the constraint condition signal $S_{rc}$ and whose values for the path metric signals $S_{pm}$ are minimal are determined for each of $k^{M-1}$ states, and the results are output to the path metric calculation circuit 104 as the $k^{M-1}$ survivor path metric signals $S_{pmsv}$. In addition, among the $k^M$ series of candidate signals $S_{scan}$, a specified portion of the series of candidate signals $S_{scan}$, corresponding to those among the $k^{M-1}$ survivor path metric signals $S_{pmsv}$ that are minimal are output as decision output signals $S_d$. For example, the lowest bit of the series of candidate signals $S_{scan}$ is output as the decision output signal $S_d$. That is, it is determined to be the most likely received signal.

Reference numeral 201 is a constraint condition selection circuit that inputs the decision output signal $S_d$ output from the survivor path selection circuit 105. Additionally, constraint condition selection signal $S_{rcsel}$ is generated from the input decision output signals $S_d$ in order to select the constraint condition corresponding to the regularity of the code. In addition, the generated constraint condition selection signal $S_{rcsel}$ is output to the constraint condition generation circuit 107, described next.

Reference numeral 107 is a constraint condition generating circuit that inputs the $k^M$ series of candidate signals $S_{scan}$ and the constraint condition selection signal $S_{rcsel}$. In addition, the constraint condition is determined for each of the $k^{M-1}$ states of the trellis diagram based on the regularity of the code corresponding to the input constraint condition selection signal $S_{rcsel}$ and the $k^M$ series of candidate signals $S_{scan}$. Next, the constraint condition signal $S_{rc}$ that represents the determined constraint condition is generated. In addition, the generated constraint condition signal $S_{rc}$ is output to the survivor path selection circuit 105.

Next, the operation of the second embodiment will be explained using specific numerical values.

Suppose, for example, that the transmitted code has the two levels, "0" and "1", and that the series of candidate signals $S_{scan}$ has a 2-chip length. Here, a case will be explained in which the code decision is carried out at time I.

As shown in FIG. 2, $S_{can}$ (1) corresponds to the candidate of the decision output signal $S_d$ (I) in time I. In addition, $S_{can}$ (2) corresponds to the candidate of the decision output signal $S_d$ (I+1) at time (I+1).

Here, the constraint condition represented by the constraint condition signal $S_{rc}$ is assumed to be $S_{scan}$ (2)=$S_{scan}$ (1). It is assumed that this condition, for example, is always generated after the known transmitted code series. Thus, the constraint condition selection circuit 201 selects the condition that $S_{scan}$ (2)-$S_{scan}$ (1) in the case that the known transmission code series matches the decision output signal $S_d$ up to time (I-1). Moreover, the process of deciding the survivor path metric signal $S_{scan}$ at time (I-1) is the same as that in the first embodiment, and thus its explanation is omitted.

Third Embodiment

Next, a third embodiment of the present invention will be explained referring to FIG. 4 and FIG. 5.

Figure 4:
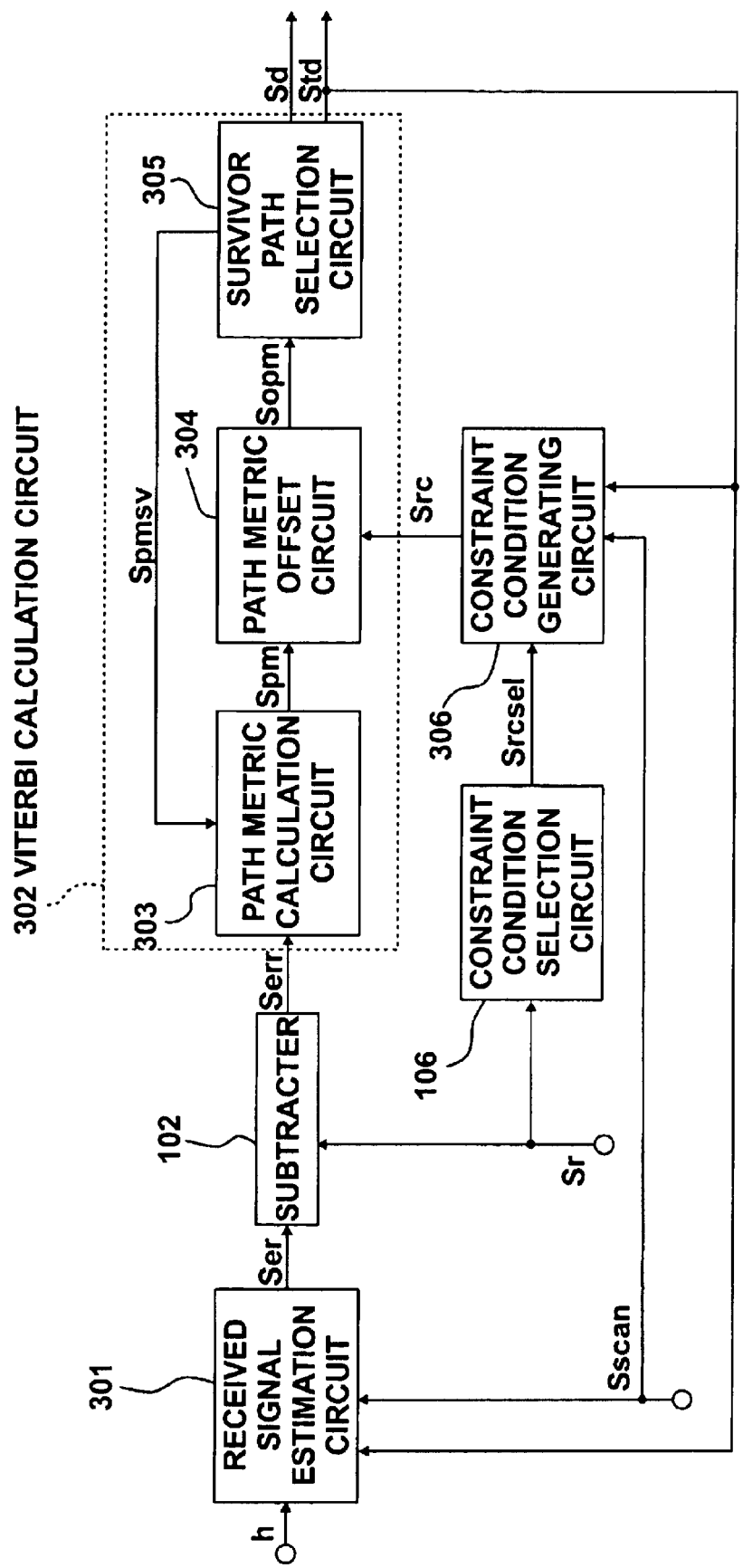
FIG. 4 is a block diagram of the automatic equalizer according to a third embodiment of the present invention.

FIG. 4 is a block diagram showing the automatic equalizer according to a third embodiment of the present invention. FIG. 5 is a trellis diagram in the code decision of the third embodiment.

In FIG. 4, reference numeral 301 is a received signal estimation circuit that inputs $k^M$ series of candidate signals $S_{scan}$ that are combinations of transmitted code having an M chip length and k levels, $k^{m-1}$ series of hypothetical output signals $S_{td}$ having an N chip length, and a transmission channel impulse response h having a length (M+N). Additionally, the received signal $S_r$ is estimated by convolutional processing of the combination of $k^{M-1}$ hypothetical output signals $S_{td}$ corresponding respectively to the $k^M$ series of candidate signals $S_{scan}$, and the transmission channel impulse response h having a length (M+N). Next, the estimated $k^M$ estimated received signals $S_{er}$ are output to the subtracter 102, explained next.

Reference 102 is a subtracter that inputs the received signal $S_r$ and the $k^M$ estimated received signals $S_{er}$. Additionally, $k^M$ estimated error signals $S_{err}$ are generated by subtracting each of the $k^M$ estimated received signals $S_{er}$ from the input received signal $S_r$. Next, the generated $k^M$ estimated error signals $S_{err}$ are output to the path metric calculation circuit 303, described below.

Reference numeral 302 is a Viterbi calculation circuit that is formed by the path metric calculation circuit 303, a path metric offset circuit 304, and a survivor path selection circuit 305, all described below.

Reference numeral 303 is a path metric calculation circuit that inputs $k^M$ estimated error signals $S_{err}$ and $k^{M-1}$ survivor path metric signals $S_{pmsv}$ that correspond to each of the states of the trellis diagram. In addition, the path metric calculation circuit 303 squares the absolute value of the $k^M$ estimated error signals $S_{err}$ corresponding respectively to the $k^{M-1}$ survivor path metric signals $S_{pmvs}$ and generates $k^M$ path metric signals $S_{pm}$. Next, these generated $k^M$ path metric signals $S_{pm}$ are output to the path metric offset circuit 304, described next.

Reference numeral 304 is a path metric offset circuit that inputs the $k^M$ path metric signals $S_{pm}$ and the constraint condition signal $S_{rc}$. In addition, $k^M$ offset path metric signals $S_{opm}$ are generated by adding a constant offset value only to those among the $k_M$ path metric signals $S_{pm}$ for which the state transitions in the trellis diagram do not satisfy the constraint condition represented by the constraint condition signal $S_{rc}$. Next, the generated $k^M$ offset path metric signals $S_{opm}$ are output to the survivor path selection circuit 305, described next.

Reference numeral 305 is a survivor path selection circuit that inputs the $k^M$ path metric signals $S_{opm}$. Additionally, the KM-1 survivor path metric signals $S_{pmsv}$ are generated by determining which among the am offset path metric signals $S_{omp}$ are minimal. Next, the generated $k^{M-1}$ survivor path metric signals $S_{pmsv}$ are output to the path metric calculation circuit 303. In addition, among the $k^M$ series of candidate signals $S_{scan}$, a specified portion of the series of candidate signals $S_{scan}$, corresponding respectively to those among the $k^{M-1}$ survivor path metric signals $S_{pmsv}$ are output as hypothetical output signals $S_{td}$. For example, for specified portion, the lowest bit of the series of candidate signals $S_{scan}$ is output as the hypothetical output signal $S_{td}$. In addition, among the $k^M$ series of candidate signals $S_{scan}$, a specified portion of the series of candidate signals $S_{scan}$, corresponding to those among the $k^{M-1}$ survivor path metric signals $S_{pmsv}$ that are minimal are output as decision output signals $S_d$. For example, for a specified portion, the lowest bit of the series of candidate signals $S_{scan}$ is output as the decision output signal $S_{td}$. That is, it is determined to be the most likely received signal.

Reference numeral 106 is a constraint condition selection circuit that inputs the received signal $S_r$. Additionally, it detects the regularity of the code based on the received signal $S_r$. Next, constraint condition selection signal $S_{rcsel}$ is generated in order to select the constraint condition corresponding to the regularity of the detected code. In addition, the generated constraint condition selection signal $S_{rcsel}$ is output to the constraint condition generation circuit 306, described next.

Reference numeral 306 is a constraint condition generating circuit that inputs the $k^M$ series of candidate signals $S_{scan}$, $k^{M-1}$ hypothetical output signals $S_{td}$, and the constraint condition selection signal $S_{rcsel}$. In addition, the constraint condition is determined for each of the $k^{M-1}$ states of the trellis diagram based on the regularity of the code corresponding to the constraint condition selection signals Srcsel, $k^M$ series of candidate signals $S_{scan}$, and the $k^{M-1}$ hypothetical output signals $S_{td}$. Next, the constraint condition signal $S_{rc}$ that represents the determined constraint condition is generated. In addition, the generated constraint condition signal $S_{rc}$ is output to the path metric offset circuit 304.

Next, the operation of the third embodiment will be explained using specific numerical values.

For example, suppose that the transmitted code has two levels "0" and "1", the series of candidate signals $S_{scan}$ has a 2-chip length, and the hypothetical output signals $S_{td}$ have a 1-chip length. Here, a case will be explained in which the code decision is carried out at time I.

Figure 5:
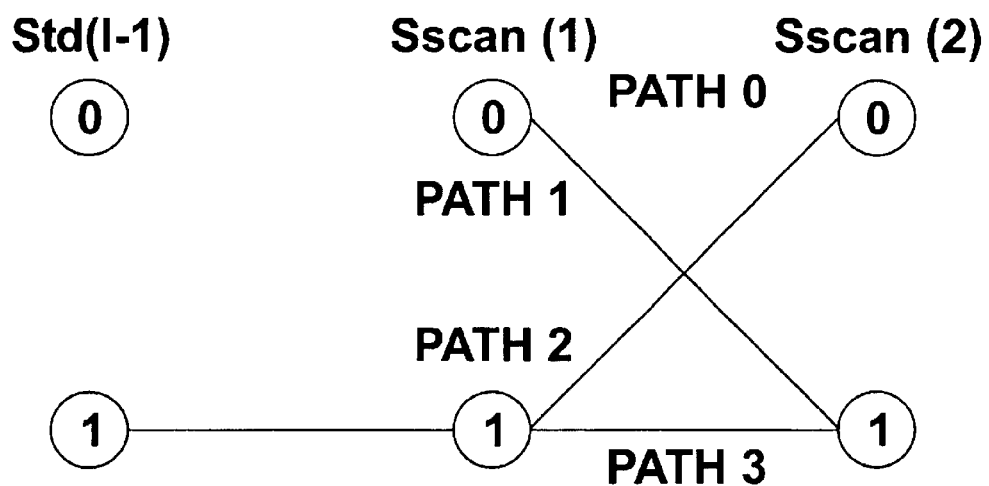
FIG. 5 is a trellis diagram in the code decision according to a third embodiment of the present invention.

As shown in FIG. 5, $S_{scan}$ (1) corresponds to the candidate of the-decision output signal $S_d$ (I) at time I. In addition, $S_{scan}$ (2) corresponds to the candidate of the decision output signal $S_d$ (I+1) at time (I+1).

Here, the constraint condition represented by the constraint condition signal $S_{rc}$ is assumed to be $S_{scan}$ (2)=$S_{scan}$ (1)×$S_{td}$ (I−1).

Furthermore, the received signal $S_r$ is assumed to be 0.5. In addition, in FIG. 5, at path 0, the estimated received signal $S_{er}$ (0)=0.3, at path 1, the estimated received signal $S_{er}$ (1)=0.4, at path 2, the estimated receive signal $S_{er}$ (2)=0.4, and at path 3. the estimated received signal $S_{er}$ (3)=0.7. At this time, each of the estimated error signals $S_{err}$ is:

$S_{err}(0)=S_r-S_{er}(0)=0.5-0.3=0.2$ $S_{err}(1)=S_r-S_{er}(1)=0.5-0.4=0.1$ $S_{err}(2)=S_r-S_{er}(2)=0.5-0.4=0.1$ $S_{err}(3)=S_r-S_{er}(3)=0.5-0.7=-0.2$ In addition, the survivor path metric signal in the case that the state is "0" at time I is $S_{pmsv}$ (0)=0.12, and the survivor path metric signal in the case that the state is "1" is $S_{pmsv}$ (1)=0.1. The path metric signals $S_{pm}$ corresponding to the paths 0, 1, 2, and 3 in this case are:

$S_{pm}(0)=S_{pmsv}(0)+|S_{err}(0)|^2=0.12+|0.2|^2=0.16$ $S_{pm}(1)=S_{pmsv}(0)+|S_{err}(1)|^2=0.12+|0.1|^2=0.13$ $S_{pm}(2)=S_{pmsv}(0)+|S_{err}(2)|^2=0.1+|0.1|^2=0.11$ $S_{pm}(3)=S_{pmsv}(0)+|S_{err}(3)|^2=0.1+|-0.2|^2=0.14$ Here, path 0 and path 3 satisfy the constraint condition $S_{scan}$ (2)=$S_{scan}$ (1)×$S_{td}$ (I−1), while path 1 and path 2 do not satisfy $S_{scan}$ (2)=$S_{scan}$ (1)×$S_{td}$ (I−1). Therefore, the offset path metric signal $S_{pm}$ corresponding to path 1 and path 2 adds a constant offset value to the path metric signals Spm having a constant offset value added thereto. For example, assuming an offset value of 0.5, the offset path metric signals $S_{opm}$ corresponding to paths 0, 1, 2, and 3 are:

$S_{opm}(0)=S_{pm}(0)=0.16$ $S_{opm}(1)=S_{pm}(1)+0.5=0.13+0.5=0.63$ $S_{opm}(2)=S_{pm}(2)=0.11+0.5=0.61$ $S_{opm}(3)=S_{pm}(3)=0.14$ For the smaller survivor path metric signals in state "0" at time (I+1), the smaller of $S_{opm}$ (0) and $S_{opm}$ (2), is selected. In addition, for survivor path metric signals instate "1" at time (I+0), the smaller of $S_{opm}$ (1) and $S_{opm}$ (3) is selected. Thus, the survivor path metric signals $S_{pmsv}$ in states "0" and "1" at time (I+1) are:

$S_{pmv}(0)=S_{opm}(0)=0.16$ $S_{pmv}(1)=S_{opm}(3)=0.14$

Fourth Embodiment

Next, a fourth embodiment of the present invention will be explained referring to FIG. 6 and FIG. 7.

Figure 6:
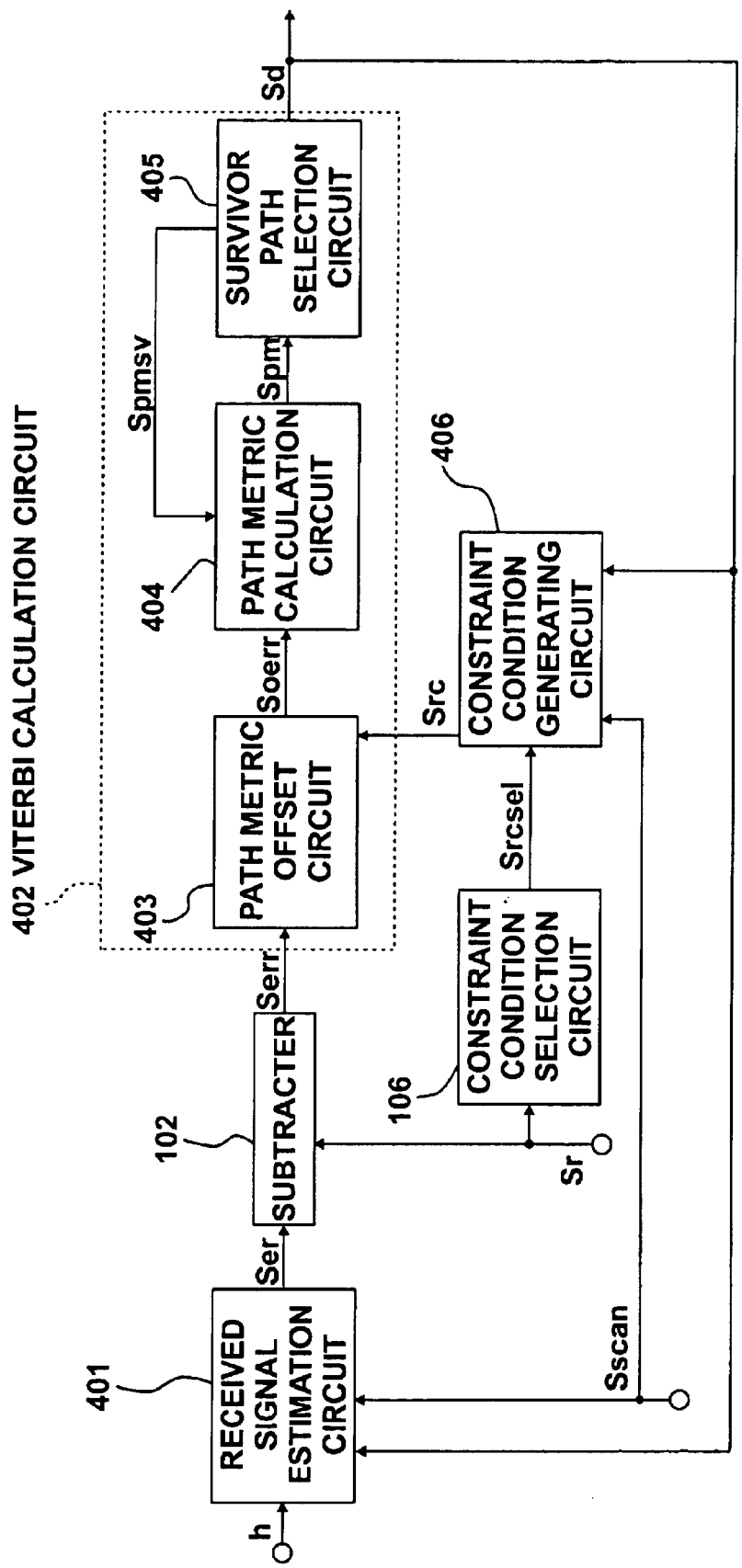
FIG. 6 is a block diagram of the automatic equalizer according to a fourth embodiment of the present invention.

FIG. 6 is a block diagram showing the automatic equalizer according to a fourth embodiment of the present invention. FIG. 7 is a trellis diagram in the code decision of the third embodiment.

In FIG. 6, reference numeral 401 is a received signal estimation circuit that inputs $k^M$ series of candidate signals $S_{scan}$ that are combinations of transmitted code having an M chip length (where M is a natural number) and k levels, a decision output signal $S_d$ having an N chip length (where N is a natural number) output from the survivor path selection circuit 405, described below, and a transmission channel impulse response h having a length (M+N). Additionally, the received signals are estimated by carrying out convolutional processing on the combination of decision output signals $S_d$ corresponding respectively to the $k^M$ series of candidate signals $S_{scan}$ and a transmission channel impulse response h having a length (M+N). Next, the estimated $k^M$ estimated received signals $S_{er}$ are output to the subtracter 102, explained next.

Reference 102 is a subtracter that inputs the received signals $S_r$ and the $k^M$ estimated received signals $S_{er}$. Additionally, $k^M$ estimated error signals $S_{err}$ are generated by subtracting each of the $k^M$ estimated received signals $S_{er}$ from the input received signals $S_r$. Next, the generated $k^M$ estimated error signals $S_{err}$ are output to the estimated error offset circuit 403, described below.

Reference numeral 402 is a Viterbi calculation circuit that is formed by the estimated error offset circuit 403, a path metric offset circuit 404, and a survivor path selection circuit 405, all described below.

Reference numeral 403 is an estimated error offset circuit that inputs the $k^M$ estimated error signals $S_{err}$ and the constraint condition signal $S_{rc}$. In addition, the $k^M$ offset estimated error signals $S_{oerr}$ are generated by adding a constant offset value only to those among the $k^M$ estimated error signals $S_{er}$ for which the state transitions in the estimated error diagram do not satisfy the constraint condition represented by the constraint condition signal $S_{rc}$. Next, the generated $k^M$ offset estimated error signals $S_{oerr}$ are output to a path metric calculation circuit 404, described next.

Reference numeral 404 is a path metric calculation circuit that inputs $k^M$ offset estimated error signals $S_{oerr}$ and $k^{M-1}$ survivor path metric signals $S_{pmsv}$ that correspond to each of the states of the estimated error diagram. In addition, the path metric calculation circuit 404 squares the absolute value of the $k^M$ offset estimated error signals $S_{oerr}$ corresponding respectively to the $k^{M-1}$ survivor path metric signals $S_{pmsv}$, and generates $k^M$ path metric signals $S_{pm}$. Next, these generated $k^M$ path metric signals $S_{pm}$ are output to the survivor path selection circuit 405, described next.

Reference numeral 405 is a survivor path selection circuit that inputs the $k^M$ path metric signals $S_{opm}$. In addition, $k^{M-1}$ survivor path metric signals $S_{pmsv}$ are generated by determining for each of the $k^{M-1}$ states those among the $k^M$ path metric signals $S_{pm}$ that are minimal. Next, the generated $k^{M-1}$ survivor path metric signals $S_{pmsv}$ are output to the path metric calculation circuit 404. In addition, among the $k^M$ series of candidate signals $S_{scan}$, a specified portion of the series of candidate signals $S_{scan}$ that correspond to those among the $k^{M-1}$ series of candidate signals $S_{pmsv}$ that are minimal are output as decision output signals $S_d$. The specified portion, for example, is the lowest bit of the series of candidate signals $S_{scan}$ output as a hypothetical output signals $S_{td}$. That is, the most likely received signals are determined.

Reference numeral 106 is a constraint condition selection circuit that inputs the received signals $S_r$. Additionally, it detects the regularity of the code based on the received signals $S_r$. Next, constraint condition selection signals $S_{rcsel}$ are generated in order to select the constraint condition corresponding to the regularity of the detected code. In addition, the generated constraint condition selection signal $S_{rcsel}$ is output to the constraint condition generation circuit 406, described next.

Reference numeral 406 is a constraint condition generating circuit that inputs the $k^M$ series of candidate signals $S_{scan}$, decision output signals $S_d$, and the constraint condition selection signal $S_{rcsel}$. In addition, the constraint condition is determined for each of the $k^{M-1}$ states of the estimated error diagram based on the regularity of the code corresponding to the constraint condition selection signal $S_{rcsel}$, the $k^M$ series of candidate signals $S_{scan}$, and the decision output signals $S_d$. Next, the constraint condition signal $S_{rc}$ that represents these determined constraint condition is generated. In addition, the generated constraint condition signal $S_{rc}$ is output to the estimated error offset circuit 403.

Next, the operation of the fourth embodiment will be explained using specific numerical values.

Suppose, for example, that the transmitted code has two levels, "0" and "1", the series of candidate signals $S_{scan}$ have a 2-chip length, and the decision output signals $S_d$ used in the received signal estimation have a 1-chip length. Here, a case will be explained in which the code decision is carried out at time I.

Figure 7:
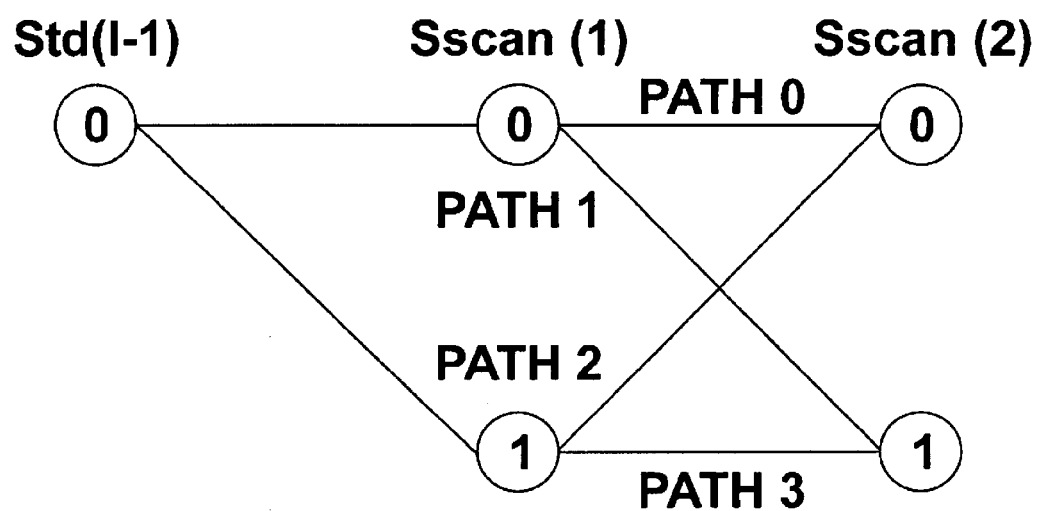
FIG. 7 is a trellis diagram in the code decision according to a fourth embodiment of the present invention.
Figure 8:
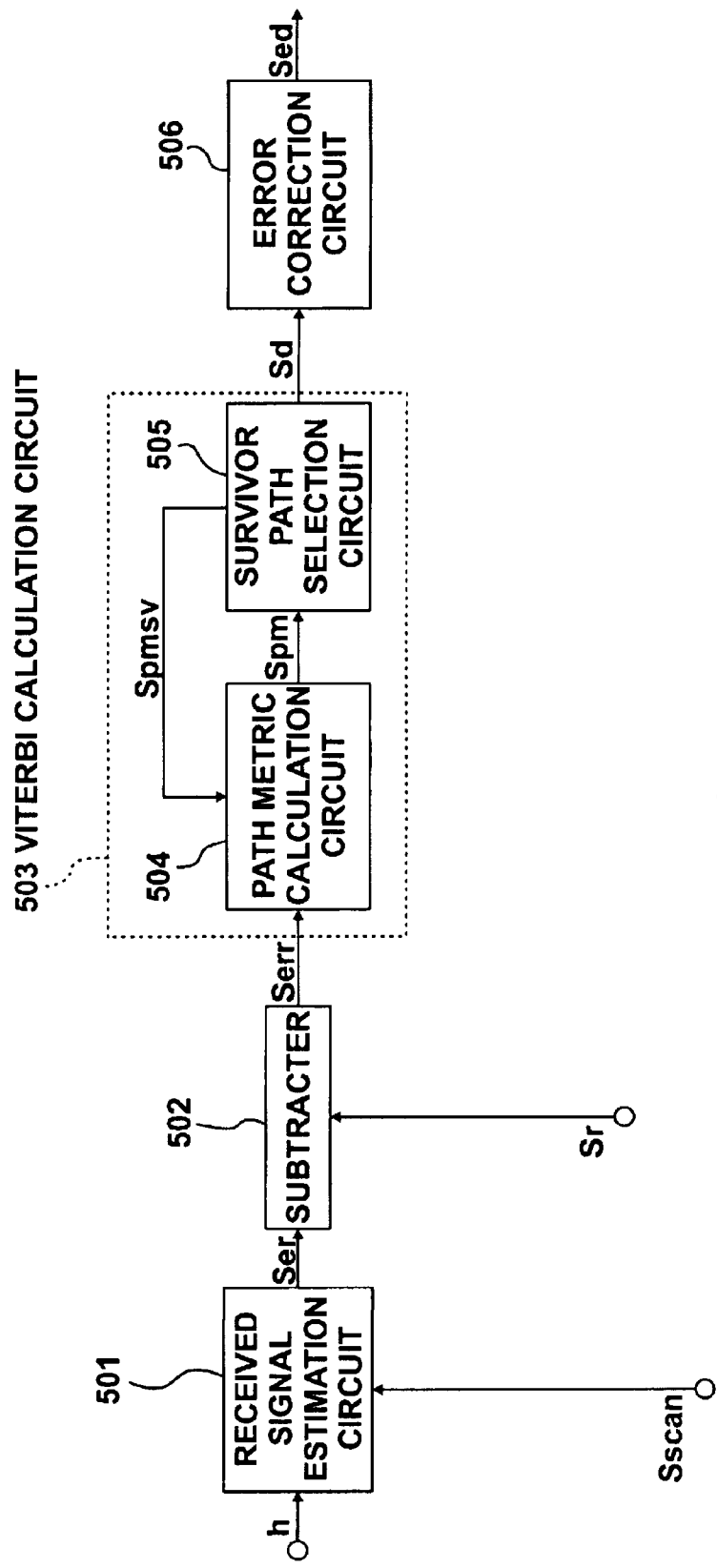
FIG. 8 is a block diagram of a conventional automatic equalizer.
Figure 9:
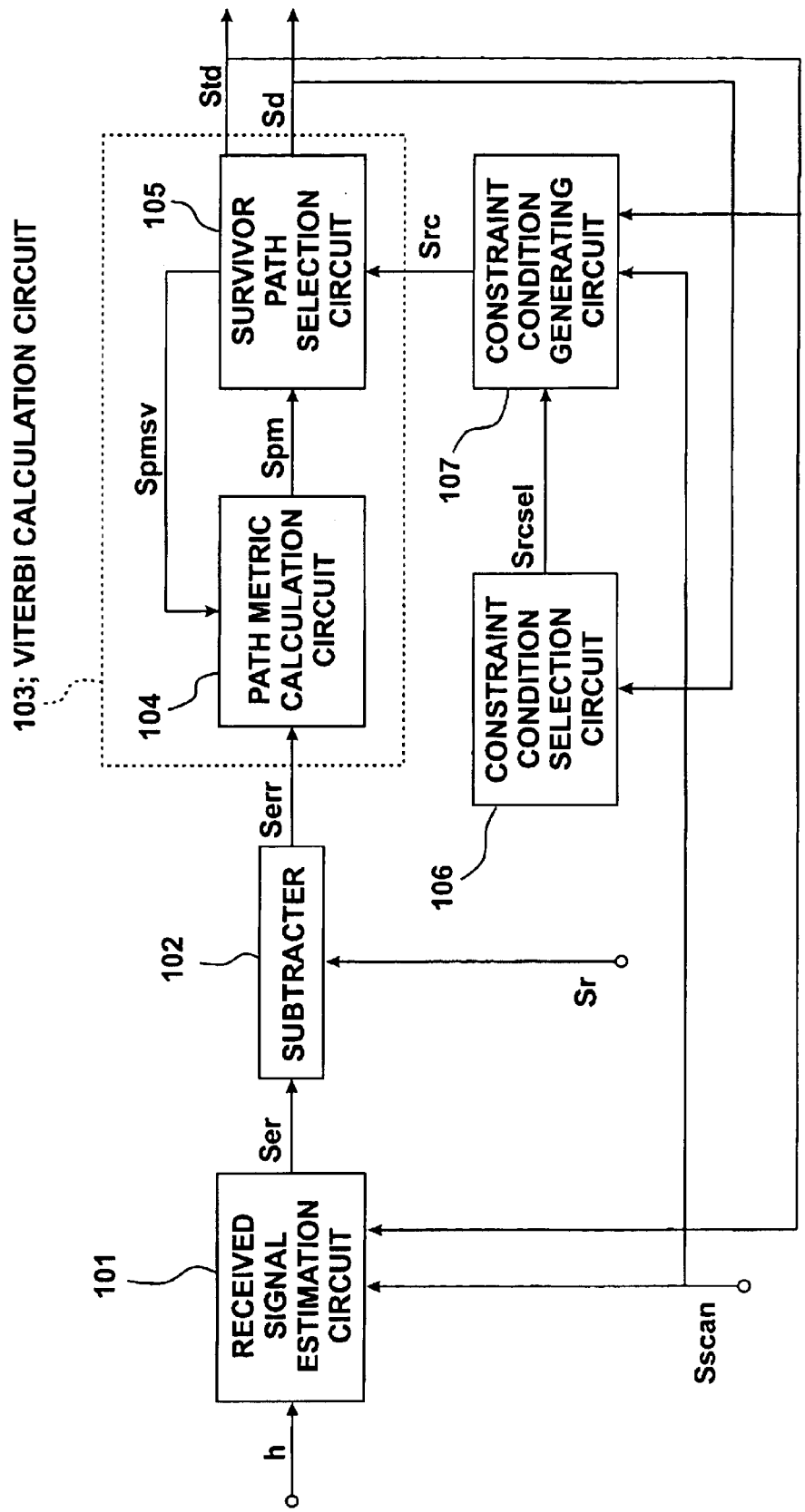
FIG. 9 is a block diagram of the automatic equalizer according to an embodiment of the invention.
Figure 10:
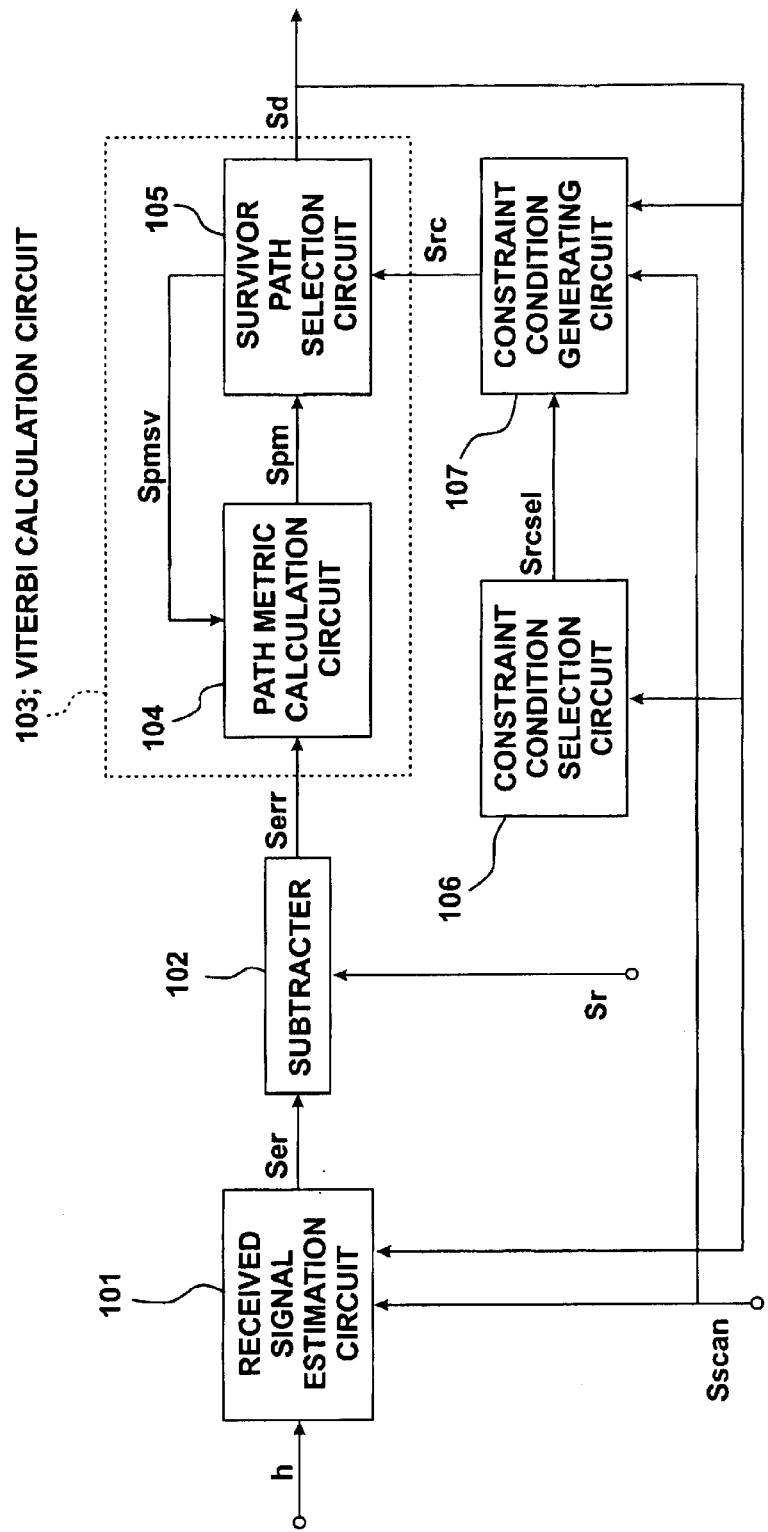
FIG. 10 is a block diagram of the automatic equalizer according to an embodiment of the invention.

As shown in FIG. 7, $S_{scan}$ (1) corresponds to the candidate of the decision output signal $S_d$ (I) at time I. In addition, $S_{scan}$ (2) corresponds to the candidate decision output signal $S_d$ (I+1) at time (I+1).

Here, the constraint condition represented by the constraint condition signal $S_{rc}$ is assumed to be $S_{scan}$ (2)=$S_{scan}$ (1)33 $S_{td}$ (I−1).

What is claimed is:

1. An automatic equalizer comprising:

a received signal estimation circuit that inputs a $k^M$ series of candidate signals that are combinations of transmitted code having an M chip length (where M is a natural number) and k levels (where k is a natural number) and a transmission channel impulse response having a length M, estimates a received signal by respectively carrying out convolutional processing on said $k^M$ series of candidate signals and said transmission channel impulse response having length M, and outputs an estimated $k^M$ estimated received signals;

a subtracter that inputs the received signal and said $k^M$ estimated received signals, generates $k^M$ estimated error signals by subtracting each of said $k^M$ estimated received signals from said received signal, and outputting said generated $k^M$ estimated error signals;

a constraint condition selection circuit that inputs said received signal, generates a constraint condition selection signal that represents the regularity of the code of said received signal, and outputs said generated constraint condition selection signal;

a constraint condition generation circuit that inputs said $k^M$ series of candidate signals and said constraint condition selection signal, determines the constraint condition for each of $k^{M-1}$ states of an estimated error diagram based on the regularity of the code that said constraint condition selection signal represents and said $k^M$ series of candidate signals, and outputs the constraint condition signal that represents the results of this decision, and a Viterbi calculation circuit that inputs said $k^M$ estimated error signals and said constraint condition signal, generates decision output signals based on said $k^M$ estimated error signals and the constraint condition signal, and outputs said generated decision output signals.

2. An automatic equalizer according to claim 1, wherein the Viterbi calculation circuit comprises:

a path metric calculation circuit that inputs the $k^M$ estimated error signals and a $k^{M-1}$ survivor path metric signals corresponding to each state of the trellis diagram, calculates the absolute value of said $k^M$ estimated error signals respectively corresponding to the $k^{M-1}$ survivor path metric signals, and outputs $k^M$ path metric signals; and a survivor path selection circuit that inputs said $k^M$ path metric signals and the constraint condition signal, determines among the $k^M$ path metric signals those for which the state transition in the trellis diagram satisfy and minimize a serial candidate signal represented by said constraint condition signal for each of $k^{M-1}$ state, and outputs the result as said $k^{M-1}$ survivor path metric signals, and at the same time outputs, among a $k^M$ series of candidate signals, as said decision output signals a specified portion of said $k^M$ series of candidate signals corresponding to those for which said $k^{M-1}$ survivor path metric signals are minimal.

3. An automatic equalizer according to claim 1, wherein the Viterbi calculation circuit comprises:

a path metric calculation circuit that inputs the $k^M$ estimated error signals and a $k^{M-1}$ survivor path metric signals corresponding to each state of the trellis diagram, and outputs $k^M$ path metric signals to which square of the absolute value of $k^M$ offset estimated error signals corresponding respectively to the $k^{M-1}$ survivor path metric signals has been added;

a path metric offset circuit that inputs said $k^M$ path metric signals and said constraint condition signal, and outputs $k^M$ offset path metric signals having an added specified offset value only to those among said $k^M$ path metric signals for which the state transitions of the trellis diagram do not fulfill said constraint conditions represented by said constraint condition signal; and a survivor path selection circuit that inputs said $k^M$ offset path metric signals, determines for each of the $k^{M-1}$ states those among said $k^M$ offset path metric signals that are minimal, and outputs the result as said $k^{M-1}$ survivor path metric signals, and at the same time outputs as decision output signals a specified portion of said series of candidate signals among said $k^M$ series of candidate signals for which said corresponding $k^{M-1}$ survivor path metric signals are minimal.

4. An automatic equalizer according to claim 1, wherein the Viterbi calculation circuit comprises:

an estimated error offset circuit that inputs the $k^M$ estimated error signals and the constraint condition signal, and among said $k^M$ estimated error signals, outputs $k^M$ offset estimated error signals having added a specified offset value only to those for which the state transitions in the trellis diagram do not satisfy the constraint condition represented by said constraint condition signal;

a path metric calculation circuit that inputs said $k^M$ offset estimated error signals and $k^{M-1}$ survivor path metric signals corresponding to each state of the trellis diagram, and outputs $k^M$ path metric signals to which square of the absolute value of the $k^M$ offset estimated error signals corresponding respectively to the $k^{M-1}$ survivor path metric signals has been added; and a survivor path selection circuit that inputs said $k^M$ path metric signals, determines for each of $k^{M-1}$ conditions those among said $k^M$ path metric signals that are minimal, and outputs the result as said $k^{M-1}$ survivor path metric signals, and at the same time outputs as said decision output signals a specified portion of said series of candidate signals corresponding to those among said $k^M$ series of candidate signals for which said $k^{M-1}$ survivor path metric signals are minimal.

5. An automatic equalizer comprising:

a received signal estimation circuit that inputs a $k^M$ series of candidate signals that are combinations of a transmitted code having an M chip length (where M is a natural number) and k levels (where k is a natural number) and a transmission channel impulse response having a length M, estimates a received signal by respectively carrying out convolutional processing on said $k^M$ series of candidate signals and said transmission channel impulse response having length M and outputs an estimated $k^M$ estimated received signals;

a subtracter that inputs the received signal and said $k^M$ estimated received signals, generates $k^M$ estimated error signals by subtracting each of said $k^M$ estimated received signals from said received signal, and outputting said generated $k^M$ estimated error signals;

a constraint condition selection circuit that inputs decision output signals, generates a constraint condition selection signal that represents the regularity of the code of said received signal, and outputs said generated constraint condition selection signal;

a constraint condition generation circuit that inputs said $k^M$ series of candidate signals and said constraint condition selection signal, determines the constraint condition for each of $k^{M-1}$ states of an estimated error diagram based on the regularity of the code that said constraint condition selection signal represents and said $k^M$ series of candidate signals, and outputs the constraint condition signal that represents the results of this decision, and a Viterbi calculation circuit that inputs said $k^M$ estimated error signals and said constraint condition signal, generates decision output signals based on said $k^M$ estimated error signals and said constraint condition signal, and outputs said generated decision output signals.

6. An automatic equalizer according to claim 5, wherein the Viterbi calculation circuit comprises:

a path metric calculation circuit that inputs the $k^M$ estimated error signals and $k^{M-1}$ survivor path metric signals corresponding to each state of the trellis diagram, calculates the absolute value of said $K^M$ estimated error signals respectively corresponding to the $k^{M-1}$ survivor path metric signals, and outputs $k^M$ path metric signals; and a survivor path selection circuit that inputs said $k^M$ path metric signals and the constraint condition signal, determines among the $k^M$ path metric signals those for which the state transition in the trellis diagram satisfy and minimize the serial candidate signal represented by said constraint condition signal for each of $k^{M-1}$ state, and outputs the result as said $k^{M-1}$ survivor path metric signals, and at the same time outputs, among said $k^M$ series of candidate signals, as said decision output signals a specified portion of said $k^M$ series of candidate signals corresponding to those for which said $k^{M-1}$ survivor path metric signals are minimal.

7. An automatic equalizer according to claim 5, wherein the Viterbi calculation circuit comprises:

a path metric calculation circuit that inputs the $k^M$ estimated error signals and $k^{M-1}$ survivor path metric signals corresponding to each state of the trellis diagram, and outputs $k^M$ path metric signals to which square of the absolute value of $k^M$ offset estimated error signals corresponding respectively to the $k^{M-1}$ survivor path metric signals has been added;

a path metric offset circuit that inputs said $k^M$ path metric signals and said constraint condition signal, and outputs $k^M$ offset path metric signals having added a specified offset value only to those among said $k^M$ path metric signals for which the state transitions of the trellis diagram do not fulfill said constraint conditions represented by said constraint condition signal; and a survivor path selection circuit that inputs said $k^M$ offset path metric signals, determines for each of the $k^{M-1}$ states those among said $k^M$ offset path metric signals that are minimal, and outputs the result as said $k^{M-1}$ survivor path metric signals, and at the same time outputs as decision output signals a specified portion of said series of candidate signals among said $k^M$ series of candidate signals for which said corresponding $k^{M-1}$ survivor path metric signals are minimal.

8. An automatic equalizer according to claim 5, wherein the Viterbi calculation circuit comprises:

an estimated error offset circuit that inputs the $k^M$ estimated error signals and the constraint condition signal, and among said $k^M$ estimated error signals, outputs $k^M$ offset estimated error signals having added a specified offset value only to those for which the state transitions in the trellis diagram do not satisfy the constraint condition represented by said constraint condition signal;

a path metric calculation circuit that inputs said $k^M$ offset estimated error signals and $k^{M-1}$ survivor path metric signals corresponding to each state of the trellis diagram, and outputs $k^M$ path metric signals to which square of the absolute value of the $k^M$ offset estimated error signals corresponding respectively to the $k^{M-1}$ survivor path metric signals has been added; and a survivor path selection circuit that inputs said $k^M$ path metric signals, determines for each of $k^{M-1}$ conditions those among said $k^M$ path metric signals that are minimal, and outputs the result as said $k^{M-1}$ survivor path metric signals, and at the same time outputs as said decision output signals a specified portion of said series of candidate signals corresponding to those among said $k^M$ series of candidate signals for which said $k^{M-1}$ survivor path metric signals are minimal.

9. An automatic equalizer comprising:

a received signal estimation circuit that inputs a $k^M$ series of candidate signals that are combinations of transmitted code having an M chip length (where M is a natural number) and k levels (where k is a natural number), $k^{M-1}$ hypothetical output signals having an N chip length (where N is a natural number), and a transmission impulse response having a length (M+N), and estimates a received signal by carrying out convolutional processing of the combination of said $k^M$ series of candidate signals and said $k^{M-1}$ hypothetical output signals respectively corresponding to said $k^M$ series of candidate signals and the transmission impulse response having a length (M+N) and outputs these estimated $k^M$ estimated received signals;

a subtracter that inputs the received signal and said $k^M$ estimated received signals, generates $k^M$ estimated error signals by subtracting each of said $k^M$ estimated received signals from said received signal, and outputting said generated $k^M$ estimated error signals;

a constraint condition selection circuit that inputs said received signal, generates a constraint selection signal that represents the regularity of the code of said received signal, and outputs said generated constraint condition selection signal;

a constraint condition generation circuit that inputs said $k^M$ series of candidate signals, said $k^{M-1}$ hypothetical output signals, and said constraint condition selection signal, determines the constraint condition for each of $k^{M-1}$ states of a trellis diagram based on the regularity of the code that said constraint condition selection signal represents, said $k^M$ series of candidate signals, and said $k^{M-1}$ hypothetical output signals, and outputs the constraint condition signal that represents the results of this decision; and a Viterbi calculation circuit that inputs said $k^M$ estimated error signals and said constraint condition signal, generates decision output signals and $k^{M-1}$ hypothetical output signals for each state of a trellis diagram by carrying out code decisions based on said $k^M$ estimated error signals and said constraint condition signal, and outputs said generated decision output signals and the $k^{M-1}$ hypothetical output signals for each state of the trellis diagram.

10. An automatic equalizer according to claim 9, wherein the Viterbi calculation circuit comprises:

a path metric calculation circuit that inputs the $k^M$ estimated error signals and a $k^{M-1}$ survivor path metric signals corresponding to each state of the trellis diagram, calculates the absolute value of said $k^M$ estimated error signals respectively corresponding to the $k^{M-1}$ survivor path metric signals, and outputs $k^M$ path metric signals; and a survivor path selection circuit that inputs said $k^M$ path metric signals and the constraint condition signal, determines among the $k^M$ path metric signals those for which the state transition in the trellis diagram satisfy and minimize a serial candidate signal represented by said constraint condition signal for each of $k^M$ conditions, and outputs the result as said $k^{M-1}$ survivor path metric signals, and at the same time outputs, among a $k^M$ series of candidate signals, as hypothetical output signals a specified portion of said $k^M$ series of candidate signals respectively corresponding to said $k^{M-1}$ survivor path metric signals, and outputs as said decision output signals a specified portion of said $k^M$ series of candidate signals corresponding to those among said $k^{M-1}$ survivor path metric signals that are minimal.

11. An automatic equalizer according to claim 9, wherein the Viterbi calculation circuit comprises:

a path metric calculation circuit that inputs the $k^M$ estimated error signals and a $k^{M-1}$ survivor path metric signals corresponding to each state of the trellis diagram, and outputs the $k^M$ path metric signals having added the square of the absolute value of said $k^M$ estimated error signals corresponding respectively to said $k^{M-1}$ survivor path metric signals;

a path metric offset circuit that inputs said $k^M$ path metric signals and the constraint condition signal, adds a specified offset value only to those among said $k^M$ path metric signals for which the state transition in the trellis diagram does not satisfy the constraint condition represented by said constraint condition signal, and outputs the result as $k^M$ offset path metric signals; and a survivor path selection circuit that inputs said $k^M$ offset path metric signals, determines among said $k^M$ offset path metric signals those that are minimal for each of $k^{M-1}$ conditions, and outputs the result as said $k^{M-1}$ survivor path metric signals, and at the same time outputs as hypothetical output signals a specified portion of said series of candidate signals among said $k^M$ series of candidate signals that correspond respectively to said $k^{M-1}$ survivor path metric signals, and in addition, outputs as said decision output signals a specified portion of said series of candidate signals among said $k^M$ series of candidate signals those for which said corresponding $k^{M-1}$ survivor path metric signals are minimal.

12. An automatic equalizer according to claim 9, wherein the Viterbi calculation circuit comprises:

an estimated error offset circuit that inputs the $k^M$ estimated error signals and the constraint condition signal, and outputs $k^M$ offset estimated error signals having an added specified offset value only to those among said $k^M$ estimated error signals for which the state transitions in the trellis diagram do not satisfy the constraint condition represented by said constraint condition signal;

a path metric calculation circuit that inputs said $k^M$ offset estimated error signals and $k^{M-1}$ survivor path metric signals corresponding to each state of the trellis diagram, and outputs $k^M$ path metric signals to which square of the absolute value of the $k^M$ offset estimated error signals corresponding respectively to the $k^{M-1}$ survivor path metric signals has been added; and a survivor path selection circuit that inputs said $k^M$ path metric signals, determines for each of $k^{M-1}$ conditions those among said $k^M$ path metric signals that become minimum, and outputs the result as said $k^{M-1}$ survivor path metric signals, and at the same time outputs as hypothetical output signals a specified portion of said series of candidate signals respectively corresponding to said $k^{M-1}$ survivor path metric signals, and in addition, outputs as said decision output signals a specified portion of said series of candidate signals corresponding to those among said $k^M$ series of candidate signals for which said $k^{M-1}$ survivor path metric signals that are minimal.

13. An automatic equalizer comprising:

a received signal estimation circuit that inputs a $k^M$ series of candidate signals that are combinations of transmitted code having an M chip length (where M is a natural number) and k levels (where k is a natural number), $k^{M-1}$ hypothetical output signals having an N chip length (where N is a natural number), and a transmission impulse response having a length (M+N), estimates a received signal by carrying out convolutional processing on the combination of said $k^M$ series of candidate signals and said $k^{M-1}$ hypothetical output signals respectively corresponding to the $k^M$ series of candidate signals, and said transmission impulse response having a length (M+N), and outputs an estimated $k^M$ estimated received signals;

a subtracter that inputs the received signal and said $k^M$ estimated received signals, generates $k^M$ estimated error signals by subtracting each of said $k^M$ estimated received signals from said received signal, and outputting said generated $k^M$ estimated error signals;

a constraint condition selection circuit that inputs decision output signals, generates a constraint condition selection signal that represents the regularity of the code of said received signals, and outputs said generated constraint condition selection signal;

a constraint condition generation circuit that inputs said $k^M$ series of candidate signals, said $k^{M-1}$ hypothetical output signals, and said constraint condition selection signal, determines the constraint condition for each of $k^{M-1}$ states of a trellis diagram based on the regularity of the code that said constraint condition selection signal represents, said $k^M$ series of candidate signals, and said $k^{M-1}$ hypothetical output signals, and outputs the constraint condition signal that represents the results of this decision; and a Viterbi calculation circuit that inputs said $k^M$ estimated error signals and said constraint condition signal, generates the decision output signals and said $k^{M-1}$ hypothetical output signals for each state of a trellis diagram by carrying out code decisions based on said $k^M$ estimated error signals and said constraint condition signal, and outputs said generated decision output signals and said $k^{M-1}$ hypothetical output signals for each state of the trellis diagram.

14. An automatic equalizer according to claim 13, wherein the Viterbi calculation circuit comprises:

a path metric calculation circuit that inputs the $k^M$ estimated error signals and $k^{M-1}$ survivor path metric signals corresponding to each state of the trellis diagram, calculates the absolute value of said $K^M$ estimated error signals respectively corresponding to the $k^{M-1}$ survivor path metric signals, and outputs $k^M$ path metric signals; and a survivor path selection circuit that inputs said $k^M$ path metric signals and the constraint condition signal, determines among the $k^M$ path metric signals those for which the state transition in the trellis diagram satisfy and minimize the serial candidate signal represented by said constraint condition signal for each of $k^M$ conditions, and outputs the result as said $k^{M-1}$ survivor path metric signals, and at the same time outputs, among said $k^M$ series of candidate signals, as hypothetical output signals a specified portion of said $k^M$ series of candidate signals respectively corresponding to said $k^{M-1}$ survivor path metric signals, and outputs as said decision output signals a specified portion of said $k^M$ series of candidate signals corresponding to those among said $k^{M-1}$ survivor path metric signals that are minimal.

15. An automatic equalizer according to claim 13, wherein the Viterbi calculation circuit comprises:

a path metric calculation circuit that inputs the $k^M$ estimated error signals and $k^{M-1}$ survivor path metric signals corresponding to each state of the trellis diagram, and outputs the $k^M$ path metric signals having added the square of the absolute value of said $k^M$ estimated error signals corresponding respectively to said $k^{M-1}$ survivor path metric signals;

a path metric offset circuit that inputs said $k^M$ path metric signals and the constraint condition signal, adds a specified offset value only to those among said $k^M$ path metric signals for which the state transition in the trellis diagram does not satisfy the constraint condition represented by said constraint condition signal, and outputs the result as $k^M$ offset path metric signals; and a survivor path selection circuit that inputs said $k^M$ offset path metric signals, determines among said $k^M$ offset path metric signals those that are minimal for each of $k^{M-1}$ conditions, and outputs the result as said $k^{M-1}$ survivor path metric signals, and at the same time outputs as hypothetical output signals a specified portion of said series of candidate signals among said $k^M$ series of candidate signals that correspond respectively to said $k^{M-1}$ survivor path metric signals, and in addition, outputs as said decision output signals a specified portion of said series of candidate signals among said $k^M$ series of candidate signals those for which said corresponding $k^{M-1}$ survivor path metric signals are minimal.

16. An automatic equalizer according to claim 13, wherein the Viterbi calculation circuit comprises:

an estimated error offset circuit that inputs the $k^M$ estimated error signals and the constraint condition signal, and outputs $k^M$ offset estimated error signals having added a specified offset value only to those among said $k^M$ estimated error signals for which the state transitions in the trellis diagram do not satisfy the constraint condition represented by said constraint condition signal;

a path metric calculation circuit that inputs said $k^M$ offset estimated error signals and $k^{M-1}$ survivor path metric signals corresponding to each state of the trellis diagram, and outputs $k^M$ path metric signals to which square of the absolute value of the $k^M$ offset estimated error signals corresponding respectively to the $k^{M-1}$ survivor path metric signals has been added; and a survivor path selection circuit that inputs said $k^M$ path metric signals, determines for each of $k^{M-1}$ conditions those among said $k^M$ path metric signals that become minimum, and outputs the result as said $k^{M-1}$ survivor path metric signals, and at the same time outputs as hypothetical output signals a specified portion of said series of candidate signals respectively corresponding to said $k^{M-1}$ survivor path metric signals, and in addition, outputs as said decision output signals a specified portion of said series of candidate signals corresponding to those among said $k^M$ series of candidate signals for which said $k^{M-1}$ survivor path metric signals that are minimal.

17. An automatic equalizer comprising:
a received signal estimation circuit that inputs a $k^M$ series of candidate signals that are combinations of transmitted code having M chip length (where M is a natural number) and k levels (where k is a natural number), a decision output signal having an N chip length (where N is a natural number), and a transmission channel impulse response having a length (M+N), and estimates a received signal by carrying out convolutional processing on the combination of said $k^M$ series of candidate signals and said $k^{M-1}$ hypothetical output signals respectively corresponding to said $k^M$ series of candidate signals with said transmission impulse response having a length (M+N), and outputs an estimated $k^M$ estimated received signals;
a subtracter that inputs the received signal and said $k^M$ estimated received signals, generates $k^M$ estimated error signals by subtracting each of said $k^M$ estimated received signals from said received signal, and outputs these generated $k^M$ estimated error signals;
a constraint condition selection circuit that inputs said received signal, generates a constraint condition selection signal that represents the regularity of said code of the received signal, and outputs said generated constraint condition selection signal;
a constraint condition generation circuit that inputs said $k^M$ series of candidate signals, said decision output signal, and said constraint condition selection signal, determines the constraint condition for each of $k^{M-1}$ states of a trellis diagram based on the regularity of the code that said constraint condition selection signal represents, said $k^M$ series of candidate signals, and said decision output signals, and outputs the constraint condition signal that represents the results of this decision; and
a Viterbi calculation circuit that inputs said $k^M$ estimated error signals and said constraint condition signal, generates said decision output signal based on said $k^M$ estimated error signals and said constraint condition signal, and outputs the generated decision output signal.

18. An automatic equalizer according to claim 17, wherein the Viterbi calculation circuit comprises:
a path metric calculation circuit that inputs the $k^M$ estimated error signals and $k^{M-1}$ survivor path metric signals corresponding to each state of the trellis diagram, calculates the absolute value of said $K^M$ estimated error signals respectively corresponding to the $k^{M-1}$ survivor path metric signals, and outputs $k^M$ path metric signals; and
a survivor path selection circuit that inputs said $k^M$ path metric signals and the constraint condition signal, determines among the $k^M$ path metric signals those for which the state transition in the trellis diagram satisfy and minimize the serial candidate signal represented by said constraint condition signal for each of $k^{M-1}$ state, and outputs the result as said $k^{M-1}$ survivor path metric signals, and at the same time outputs, among said $k^M$ series of candidate signals, as said decision output signals a specified portion of said $k^M$ series of candidate signals corresponding to those for which said $k^{M-1}$ survivor path metric signals are minimal.

19. An automatic equalizer according to claim 17, wherein the Viterbi calculation circuit comprises:
a path metric calculation circuit that inputs the $k^M$ estimated error signals and $k^{M-1}$ survivor path metric signals corresponding to each state of the trellis diagram, and outputs $k^M$ path metric signals to which square of the absolute value of $k^M$ offset estimated error signals corresponding respectively to the $k^{M-1}$ survivor path metric signals has been added;
a path metric offset circuit that inputs said $k^M$ path metric signals and said constraint condition signal, and outputs $k^M$ offset path metric signals having an added specified offset value only to those among said $k^M$ path metric signals for which the state transitions of the trellis diagram do not fulfill said constraint conditions represented by said constraint condition signal; and
a survivor path selection circuit that inputs said $k^M$ offset path metric signals, determines for each of the $k^{M-1}$ states those among said $k^M$ offset path metric signals that are minimal, and outputs the result as said $k^{M-1}$ survivor path metric signals, and at the same time outputs as decision output signals a specified portion of said series of candidate signals among said $k^M$ series of candidate signals for which said corresponding $k^{M-1}$ survivor path metric signals are minimal.

20. An automatic equalizer according to claim 17, wherein the Viterbi calculation circuit comprises:
an estimated error offset circuit that inputs the $k^M$ estimated error signals and the constraint condition signal, and among said $k^M$ estimated error signals, outputs $k^M$ offset estimated error signals having added a specified offset value only to those for which the state transitions in the trellis diagram do not satisfied the constraint condition represented by said constraint condition signal;
a path metric calculation circuit that inputs said $k^M$ offset estimated error signals and $k^{M-1}$ survivor path metric signals corresponding to each state of the trellis diagram, and outputs $k^M$ path metric signals to which square of the absolute value of the $k^M$ offset estimated error signals corresponding respectively to the $k^{M-1}$ survivor path metric signals has been added; and
a survivor path selection circuit that inputs said $k^M$ path metric signals, determines for each of $k^{M-1}$ conditions those among said $k^M$ path metric signals that are minimal, and outputs the result as said $k^{M-1}$ survivor path metric signals, and at the same time outputs as said decision output signals a specified portion of said series of candidate signals corresponding to those among said $k^M$ series of candidate signals for which said $k^{M-1}$ survivor path metric signals are minimal.

21. An automatic equalizer comprising:
a received signal estimation circuit that inputs a $k^M$ series of candidate signals that are combinations of transmitted code having an M chip length (where M is a natural number) and k levels (where k is a natural number), decision output signals having an N chip length (where N is a natural number), and a transmission impulse response having a length (M+N), estimates a received signal by carrying out combinational processing of the combination of said $k^M$ series of candidate signals and said $k^{M-1}$ hypothetical output signals respectively corresponding to said $k^M$ series of candidate signals with the transmission impulse response having a length (M+N), and outputs estimated $k^M$ estimated received signals;

a subtracter that inputs the received signal and said $k^M$ estimated received signals, generates $k^M$ estimated error signals by subtracting each of said $k^M$ estimated received signals from said received signal, and outputs said generated $k^M$ estimated error signals;

a constraint condition selection circuit that inputs the decision output signals, generates a constraint condition selection signal that represents the regularity of the code of the received signal, and outputs said generated constraint condition selection signal;

a constraint condition generation circuit that inputs said $k^M$ series of candidate signals, said decision output signals, and said constraint condition selection signal, determines the constraint condition for each of $k^{M-1}$ states of a trellis diagram based on the regularity of the code that said constraint condition selection signal represents, said $k^M$ series of candidate signals, and said decision output signals, and outputs the constraint condition signal that represents the results of this decision; and a Viterbi calculation circuit that inputs said $k^M$ estimated error signals and said constraint condition signal, generates the decision output signals based on said $k^M$ estimated error signals and said constraint condition signal, and outputs said generated decision output signals.

22. An automatic equalizer according to claim 21, wherein the Viterbi calculation circuit comprises:

a path metric calculation circuit that inputs the $k^M$ estimated error signals and $k^{M-1}$ survivor path metric signals corresponding to each state of the trellis diagram, calculates the absolute value of said $K^M$ estimated error signals respectively corresponding to the $k^{M-1}$ survivor path metric signals, and outputs $k^M$ path metric signals; and a survivor path selection circuit that inputs said $k^M$ path metric signals and the constraint condition signal, determines among the $k^M$ path metric signals those for which the state transition in the trellis diagram satisfy and minimize the serial candidate signal represented by said constraint condition signal for each of $k^{M-1}$ state, and outputs the result as said $k^{M-1}$ survivor path metric signals, and at the same time outputs, among said $k^M$ series of candidate signals, as said decision output signals a specified portion of said $k^M$ series of candidate signals corresponding to those for which said $k^{M-1}$ survivor path metric signals are minimal.

23. An automatic equalizer according to claim 21, wherein the Viterbi calculation circuit comprises:

a path metric calculation circuit that inputs the $k^M$ estimated error signals and $k^{M-1}$ survivor path metric signals corresponding to each state of the trellis diagram, and outputs $k^M$ path metric signals to which square of the absolute value of $k^M$ offset estimated error signals corresponding respectively to the $k^{M-1}$ survivor path metric signals has been added;

a path metric offset circuit that inputs said $k^M$ path metric signals and said constraint condition signal, and outputs $k^M$ offset path metric signals having an added specified offset value only to those among said $k^M$ path metric signals for which the state transitions of the trellis diagram do not fulfill said constraint conditions represented by said constraint condition signal; and a survivor path selection circuit that inputs said $k^M$ offset path metric signals, determines for each of the $k^{M-1}$ states those among said $k^M$ offset path metric signals that are minimal, and outputs the result as said $k^{M-1}$ survivor path metric signals, and at the same time outputs as decision output signals a specified portion of said series of candidate signals among said $k^M$ series of candidate signals for which said corresponding $k^{M-1}$ survivor path metric signals are minimal.

24. An automatic equalizer according to claim 21, wherein the Viterbi calculation circuit comprises:

an estimated error offset circuit that inputs the $k^M$ estimated error signals and the constraint condition signal, and among said $k^M$ estimated error signals, outputs $k^M$ offset estimated error signals having added a specified offset value only to those for which the state transitions in the trellis diagram do not satisfy the constraint condition represented by said constraint condition signal;

a path metric calculation circuit that inputs said $k^M$ offset estimated error signals and $k^{M-1}$ survivor path metric signals corresponding to each state of the trellis diagram, and outputs $k^M$ path metric signals to which square of the absolute value of the $k^M$ offset estimated error signals corresponding respectively to the $k^{M-1}$ survivor path metric signals has been added; and a survivor path selection circuit that inputs said $k^M$ path metric signals, determines for each of $k^{M-1}$ conditions those among said $k^M$ path metric signals that are minimal, and outputs the result as said $k^{M-1}$ survivor path metric signals, and at the same time outputs as said decision output signals a specified portion of said series of candidate signals corresponding to those among said $k^M$ series of candidate signals for which said $k^{M-1}$ survivor path metric signals are minimal.

25. An automatic equalizer that compensates a received signal that has been distorted by intersymbol interference comprises:

a means for detecting regularity in a code of the received signal;

a means for calculating and outputting a path metric signals for the received signal; and a means that determines as the most likely states those states of said received signal that satisfy the detected regularity of the code of said received signal and have minimal path metric signals.

26. An automatic equalizer that compensates a received signal that has been distorted by intersymbol interference comprises:

a means for detecting regularity in code of the received signal;

a means for calculating and outputting a path metric signals for said received signal;

a means for determining whether or not said received signal satisfies the detected regularity of the code of said received signal, and only in the case that a result of the decision of said received signal does not satisfy the regularity of said code, adds a specified offset value to the path metric signals; and a means that determines as the most likely states those states of the received signal for which said path metrics are minimal.

27. An automatic equalizer that compensates a received signal that has been distorted by intersymbol interference comprises a means that generates a plurality of estimation received signals that estimate received signals by using convolutional processing;

a means that generates a plurality of estimated error signals by subtracting each of said estimated received signals from said received signal;

a means for detecting regularity in the code of the received signal;

a means for determining whether or not said received signal satisfies the detected regularity of the code of said received signal, and only in the case that a result of the decision of said received signal does not satisfy the regularity of said code, adds a specified offset value to path metric signals;

a means that calculates and outputs path metric signals in each state of said received signal from said estimated error signals; and a means that determines as the most likely states those states of said received signal for which path metric signals are minimal.

* * * * *